US012131008B2

(12) United States Patent
Stephens et al.

(10) Patent No.: US 12,131,008 B2
(45) Date of Patent: Oct. 29, 2024

(54) INTERPUPILLARY DISTANCE AND FOCAL DISTANCE INITIALIZATION FOR AN E-READER

(71) Applicant: Sindarin, Inc., San Francisco, CA (US)

(72) Inventors: Trae Benjamin Stephens, San Francisco, CA (US); Benjamin Eli Nelson Chelf, San Francisco, CA (US); Nicholas Cory Johnson, Austin, TX (US); John Aaron Boiles, Albany, CA (US); Nicholas Grant Lewis, Sparks, NV (US); Kevin Robert McKinney, Los Gatos, CA (US); Steven David Oliver, San Jose, CA (US); Tun Yuen Yeung, Fremont, CA (US); Meghan Easley, San Francisco, CA (US); Robin Porter, Los Gatos, CA (US); Jeremiah O'Leary, Chicago, IL (US); Keith Alsberg, Evanston, IL (US); Robert Samuel Clay, Cambridge, MA (US)

(73) Assignee: Sindarin, Inc., San Francisco, CA (US)

( * ) Notice: Subject to any disclaimer, the term of this patent is extended or adjusted under 35 U.S.C. 154(b) by 106 days.

(21) Appl. No.: 17/963,881

(22) Filed: Oct. 11, 2022

(65) Prior Publication Data

US 2024/0118792 A1 Apr. 11, 2024

(51) Int. Cl.
*G06F 3/0483* (2013.01)
*G02B 7/12* (2021.01)
*G06F 3/01* (2006.01)
*G06F 3/0482* (2013.01)
*G09G 3/34* (2006.01)

(52) U.S. Cl.
CPC ............. *G06F 3/0483* (2013.01); *G02B 7/12* (2013.01); *G06F 3/013* (2013.01); *G06F 3/0482* (2013.01); *G09G 3/34* (2013.01); *G09G 2330/026* (2013.01); *G09G 2354/00* (2013.01)

(58) Field of Classification Search
None
See application file for complete search history.

(56) References Cited

U.S. PATENT DOCUMENTS

| 10,268,268 | B1 * | 4/2019 | Trail .................. H04N 23/56 |
| 11,749,018 | B1 * | 9/2023 | Torkos ................ G06V 10/25 345/7 |
| 2013/0318776 | A1 * | 12/2013 | Jacobs ............... G02B 27/017 29/592.1 |
| 2016/0353093 | A1 * | 12/2016 | Lyon ................. G02B 27/017 |

(Continued)

*Primary Examiner* — Amare Mengistu
*Assistant Examiner* — Sarvesh J Nadkarni
(74) *Attorney, Agent, or Firm* — Van Pelt, Yi & James LLP

(57) ABSTRACT

A method for configuring a system having a wearable optical unit is disclosed. The method includes powering on the system, and in response to the system being powered on, using one or more processors to control the system to: determine whether to cause the system to run a configuration workflow, and in response to determining to cause the system to run the configuration workflow, (a) control the system in connection with configuring an interpupillary distance (IPD) for a user of the system, (b) determine whether the IPD is configured for the user, and (c) in response to determining that the IPD is configured for the user, control the system in connection with configuring a focus of the optical unit.

22 Claims, 22 Drawing Sheets

(56) References Cited

U.S. PATENT DOCUMENTS

| | | | |
|---|---|---|---|
| 2017/0052393 A1* | 2/2017 | Kweon | G02C 7/028 |
| 2017/0344107 A1* | 11/2017 | Aghara | G06F 3/011 |
| 2018/0047369 A1* | 2/2018 | Zhao | G06F 3/011 |
| 2018/0124375 A1* | 5/2018 | Rousseau | H04N 13/398 |
| 2020/0033560 A1* | 1/2020 | Weber | G02B 7/14 |
| 2021/0271318 A1* | 9/2021 | Bradley | G02B 27/0172 |
| 2022/0404578 A1* | 12/2022 | Lee | H04N 23/671 |
| 2023/0251458 A1* | 8/2023 | Chen | G06F 1/163 |
| | | | 345/619 |

* cited by examiner

300

320

340

360

400

425

450

500

550

600

650

INTERPUPILLARY DISTANCE AND FOCAL DISTANCE INITIALIZATION FOR AN E-READER

BACKGROUND OF THE INVENTION

Typical e-reading devices are handheld, have large screens to make them legible, and project lots of light towards the user. These characteristics pose several problems. Being handheld can cause neck or arm strain depending on the position a user holds the e-reading device. In addition, for users with shaky hands, the e-reader may not be readable. Also, the large screens are problematic because of increased power consumption with the concomitant batteries for the devices, which both cause high device weight. And last, the light projected towards the user can cause eye strain and disrupt sleep.

BRIEF DESCRIPTION OF THE DRAWINGS

Various embodiments of the invention are disclosed in the following detailed description and the accompanying drawings.

DETAILED DESCRIPTION

Figure 1:
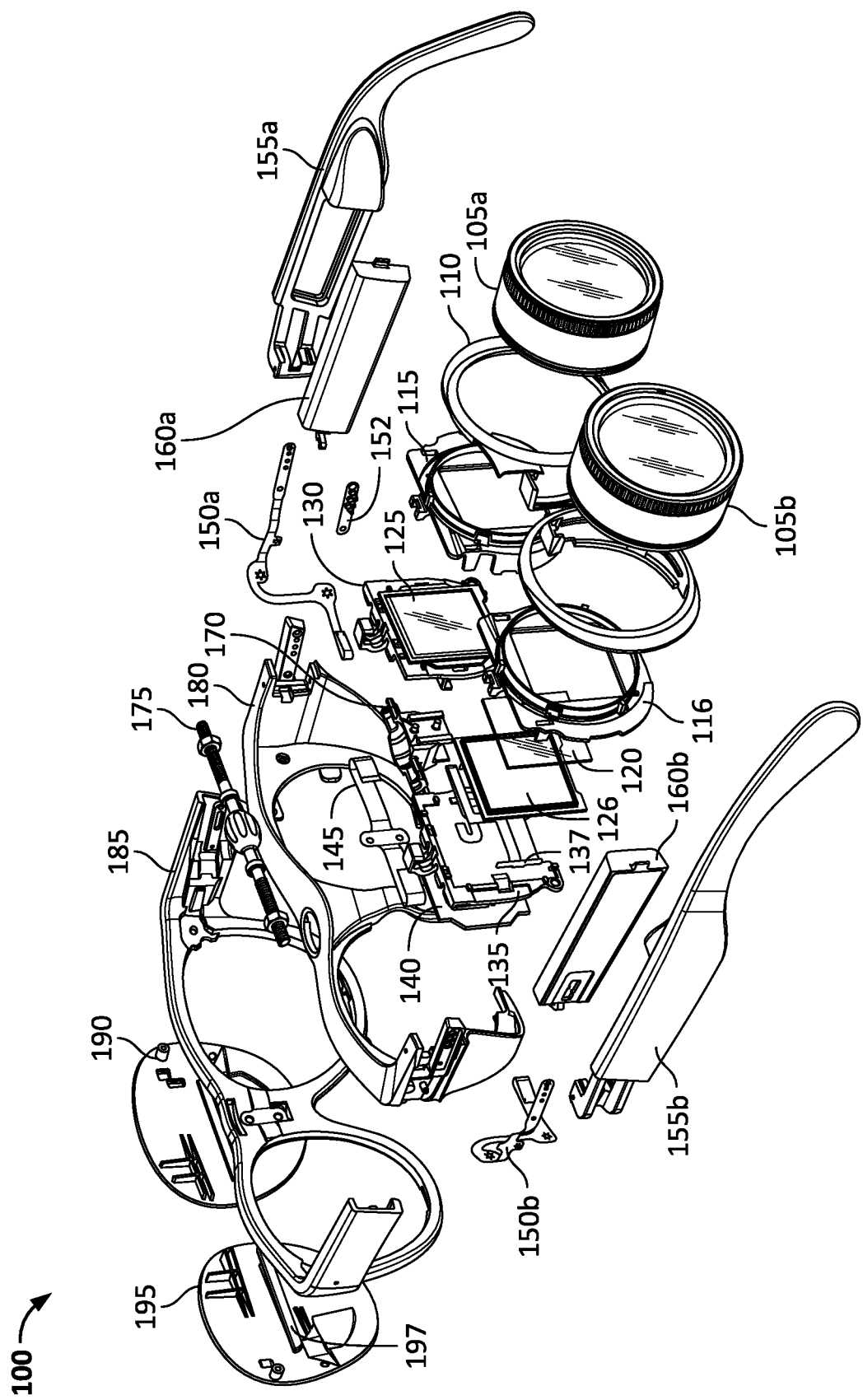
FIG. 1 is an exploded view of wearable e-reader according to various embodiments of the present application.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

As used herein, content corresponds to text or images. The content can further correspond to a video. In some embodiments, the content is comprised in a file that is stored on a memory.

As used herein, electronic ink (e-ink) corresponds to electronic paper or other display devices that mimic the appearance of physical ink on paper. An e-ink display reflects ambient light. The warm light reflected off e-ink is generally better for reading than backlight solutions especially those that emit blue light.

Various embodiments disclose a wearable electronic reader (e.g., e-reader). In some embodiments, the wearable e-reader comprises a front-lit display. As an example, the display is an e-ink display. The wearable e-reader enables hands-free reading in various postures, etc.

Various embodiments disclose a method for configuring a system having a wearable optical unit. The method includes powering on the system, and in response to the system being powered on, using one or more processors to control the system to: determine whether to cause the system to run a configuration workflow, and in response to determining to cause the system to run the configuration workflow, (a) control the system in connection with configuring an interpupillary distance (IPD) for a user of the system, (b) determine whether the IPD is configured for the user, and (c) in response to determining that the IPD is configured for the user, control the system in connection with configuring a focus of the optical unit.

Various embodiments disclose a method for configuring a system having a wearable optical unit. The method includes powering on the system, and in response to the system being powered on, using one or more processors to control the system to: determine whether to cause the system to run a configuration workflow, and in response to determining to cause the system to run the configuration workflow, (a) control the system in connection with configuring an interpupillary distance (IPD) for a user of the system, (b) determine whether the IPD is configured for the user, and (c) control to display content or menu information in response to determining that the IPD is configured. In response to determining that the IPD is configured, the system may store the IPD configuration settings, such as in association with the user (as part of the user profile).

Various embodiments disclose a method for configuring a system having a wearable optical unit. The method includes powering on the system, and in response to the system being powered on, using one or more processors to control the system to: determine whether to cause the system to run a configuration workflow, and in response to determining to cause the system to run the configuration workflow, (a) control the system in connection with configuring a vertical alignment of the optical units (e.g., vertical alignment of the content displayed on the left display unit and/or the right display unit), (b) determine whether the vertical alignment is configured for the user, and (c) control to display content and/or menu information in response to determining that the vertical alignment is configured. In response to determining that the vertical alignment is configured, the system may store the vertical alignment configuration settings, such as in association with the user (e.g., as part of the user profile).

According to various embodiments, the system comprises a locking mechanism to prevent/restrict a configuration setting from being changed. As an example, the locking mechanism includes one or more manual locks for the IPD adjustment mechanism, the vertical alignment adjustment mechanism, and/or the focus adjustment mechanism. As another example, the locking mechanism includes locking the software of the wearable e-reader to prevent the system from changing the configuration settings (e.g., by another user, such as a non-registered or unauthorized user). In some embodiments, a locking mechanism is included as part of the e-reader to protect stored content and private information on the e-reader from being viewed (e.g., a screen locking) without authentication. In various embodiments, the locking mechanism is locked or unlocked using a text interface, an audio interface, a camera, a touch, or other device interface to input an authentication sequence (e.g., entering a code, password, face image, sequence, etc.).

According to various embodiments, the system is improved using the disclosed methods such that the system is easily and efficiently configured for a user, such as upon the unpackaging/first use of the system. The system may walk the user through a configuration workflow to ensure that the system is configured for the user, such as a configuration for the user's individual physical characteristics (e.g., IPD, etc.). The configuring of the system upon initialization/resetting to factory settings ensures that the user has a positive experience when operating the system.

In some embodiments, audio instructions are provided for initializing and/or configuring an e-reader system. In various embodiments, audio instructions are enabled using a smart device by causing the instruction to be launched via a link, a quick response or QR code, a near-field communications (NFC) tag, etc. In some embodiments, the e-reader provides audio instructions for configuration via a built-in speaker.

In some embodiments, e-reader systems use an external configuration tool. For example, a gauge for measurement of the e-reader settings (especially IPD and vertical alignment) comprising an external device. In some embodiments, the external device comprises a card. In various embodiments, the card is made from paper, card stock, thin plastic, vinyl, or any other appropriate thin material. In some embodiments, the card has multiple pieces that enable different relative positions with respect to one another (e.g., a two-piece card such that the two pieces slide with respect to one another). In some embodiments, a two-piece card that goes over both lenses is used to gauge/measure the IPD setting. With this card, the user could use an application (e.g., on a smart phone) to scan their own face to determine facial geometry (e.g., using traditional computer vision and appropriately set the IPD determined by the application. In various embodiments, lidar or structured light projectors such as what is used by Face ID or any other optical face measurement systems. In some embodiments, face measurements are then used to determine the appropriate settings for the e-readers (e.g., glasses) and enables a user to set the e-readers to a correct value before even putting them on. In some embodiments, a configuration tool is built into the lens caps or other locations of the e-readers. In some embodiments, the gauge could be a feature in an application (e.g., an app on a smart phone) that allows you to scan the e-reader glasses with a phone's camera, and then the application uses computer vision along with known geometry of the glasses (e.g., the diameter of the lenses) to precisely indicate the current configuration settings (e.g., IPD, focus, nose height, etc.).

FIG. 1 is an exploded view of wearable e-reader according to various embodiments of the present application.

According to various embodiments, wearable e-reader 100 comprises an optical unit. The optical unit comprises a magnifying lens, a polarizer, a light, and a display. Wearable e-reader 100 uses the optical unit to provide content to a user during use. In the example illustrated in FIG. 1, the optical unit comprises lenses (e.g., pancake lenses 105a and 105b), a polarizer (not shown), light guide 120, and displays (e.g., e-ink displays 125 and 126).

In some embodiments, the lenses comprised in wearable e-reader 100 correspond to a small/compact lens assembly such as pancake lenses 105a and 105b. The lenses may comprise a focus adjustment mechanism. In the example illustrated in FIG. 1, pancake lenses 105a and 105b may be adjusted by rotation of the knurled ring closest to the user eye. As an example, the lenses may be the components of the optical unit that are closest to the user eye. Although the example illustrates pancake lenses 105a and 105b, various embodiments implement different lens technologies. For example, various embodiments implement other light field lens technology such as Fresnel lens, microlens array, lenticular lens, waveguide, etc. In some embodiments, a focal point/distance of a lens is proportional or roughly equivalent to the width of the lens.

According to various embodiments, the diameter of the lenses is determined based at least in part on a form factor of the display. In some embodiments, the diameter of a lens (e.g., each lens) is at least the size of the length of the diagonal of the corresponding display comprised in wearable e-reader 100. In some embodiments, the diameter of the lens (e.g., pancake lenses 105a or 105b) is selected to be small enough to allow for interpupillary distance adjustment (e.g., adjustment of the interpupillary distance between the corresponding lenses). In some embodiments, the diameter of the lens is selected to be sufficiently large enough to obtain an entire view of the display. In some embodiments, the diameter of the lens is based at least in part on (i) the interpupillary distance (IPD) adjustment range for the lenses (e.g., the IPD being adjustable between 58 mm-72 mm for a total range of 14 mm), and (ii) the size of the display (e.g., such that the diameter of the lens is at least equal to the length of the diagonal of the display).

In the example shown, wearable e-reader 100 comprises mounting structures 115 and 116. In some embodiments, mounting structures 115 and 116 are mounting structures for pancake lenses 105a and 105b. In some embodiments, pancake lenses 105a and 105b are mounted to mounting structures 115 and 116 using an adhesive. In some embodiments, mounting structures 115 and 116 comprise an alignment mechanism to maintain alignment between pancake lenses 105a and 105b and mounting structures 115 and 116. For example, the alignment mechanism may include a tab/slot interface. Mounting structures 115 and 116 may include a tab that slides into a slot on pancake lenses 105a and 105b. Conversely, pancake lenses 105a and 105b may comprise tabs that slide into corresponding slots in mounting structures 115 and 116.

In some embodiments, the polarizer is disposed between the lenses and light guide 120. In the example shown, the polarizer is bonded to pancake lenses 105a and 105b, such as with an adhesive (e.g., an optically clear adhesive). In some embodiments, the adhesive is an index matching adhesive. In some embodiments, the polarizer is bounded to, or mounted on, light guide 120. The polarizer changes polarization of light traveling from the screen to the user's eyes to ensure that the light entering the lenses has the appropriate polarization to operate with the lens (e.g., a pancake lens). In some embodiments, the lens does not require a polarization change and in that case a polarizer may not be needed in the optic train. As an example, the polarizer comprises a circular polarizer. Circular polarizers may be used if the lens corresponds to a pancake lens. However, in other implementations, different types of polarizers may be used. According to various embodiments, the polarizer is disposed at another appropriate location between an eye and the pancake lens. In some embodiments, the polarizer may be combined with the light guide into a single piece, for example by applying a polarization film onto the light guide.

In some embodiments, light guide 120 is disposed between the lenses and the displays. In the example shown, light guide 120 is disposed between inner molding 110 and e-ink display 125. According to various embodiments, light guide 120 is configured to direct light from a light source (e.g., a front light) to a display. As an example, light guide 120 can be configured to permit light to be side injected. As another example, light guide 120 can be configured to permit light to be injected to a side/surface closest to the display (e.g., a side of light guide 120 opposite to a side on which the polarizer is disposed).

According to various embodiments, light guide 120 comprises polycarbonate, glass, acrylic, polyethylene terephthalate glycol (PETG), clear glue, or any other appropriate material. As an example, polycarbonate can be machined/milled. Accordingly, use of polycarbonate in light guide 120 enables a surface/edge of light guide 120 to be shaped to promote light injection. As an example, a wedge on respective top corners (e.g., corners at the edge of a surface of light guide 120 close to the polarizer) can be milled to promote light to be appropriately reflected through light guide 120 to a display and hence to a user eye. In some embodiments, a piece at the top corners/edges of light guide 120 is ground at a 45 degree angle, and a mirror is disposed on the resulting angled surface.

According to various embodiments, light guide 120 comprises clear acrylic or polycarbonate rectangular volume. Light guide 120 can be configured to permit injection of light from a predetermined angle. In some embodiments, in the case of injection of light from a surface behind the display (e.g., such that light is directed to a surface on the display side of light guide 120), a right-angled mirror is disposed on the top edges of light guide 120 (e.g., to appropriately reflect light to the display).

According to various embodiments, light guide 120 is mounted to the displays (e.g., e-ink display 125). Light guide 120 may be optically transparent (e.g., clear) and may be mounted to the displays using an adhesive. In some embodiments, the adhesive bonding the light guide(s) and the display(s) is an index matching adhesive.

In some embodiments, light guide 120 has a polarizer coating disposed on at least one surface (e.g., a surface facing the lenses, etc.).

In the example shown, the displays of wearable e-reader 100 are e-ink displays (e.g., e-ink display 125 and/or e-ink display 126). According to various embodiments, wearable e-reader 100 can implement various display technologies. For example, rather than using e-ink displays, wearable e-reader can implement a liquid crystal display (LCD), a memory LCD technology, etc. Use of an LCD display may enable the wearable e-reader 100 to be see-through. E-ink displays are generally not see-through and external/ambient light is not permitted into the field of view.

In some embodiments, the displays comprise relatively low-resolution displays. Although the displays may be relatively low-resolution, the displays provide a sufficiently fine resolution for purposes of consuming text and images. For example, the displays have a resolution equal to or less than 500 pixels per inch (ppi). As another example, the displays have a resolution equal to about 300 ppi. As another example, the displays have a resolution of less than 300 ppi. In some embodiments, the pixel counts of each of the displays is 256×256. In some embodiments, the pixel counts of each of the displays is 800×600.

The use of the system as a wearable e-reader allows for a relatively small form factor display. In some embodiments, a display has physical dimension of 1.065" in the x-y plane (e.g., along the diagonal of the display). In some embodiments, the display has a physical dimension of 1.33" in the x-y plane.

According to various embodiments, wearable e-reader 100 comprises one or more light sources (e.g., front light(s), etc.). Various types of light sources can be used, such as a light emitting diode(s) (LED(s)). The light sources emit light that is injected to (e.g., projected in to) light guide 120. Various embodiments may implement different arrangements of the light source in relation to light guide 120 and different parts of light guide 120. For example, in some implementations, the front light is injected to light guide 120 from one or more sides of light guide 120. As another example, in some implementations, the front light is injected to a surface of light guide 120 opposite to a side at which the lens(es) are disposed (e.g., the light is injected from the display side of light guide 120). Various embodiments may include light sources that emit different colors. For example, in some implementations, the front light may use higher color temperature (more blue) light in bright ambient lighting and lower color temperature (more red) light in darker ambient lighting.

According to various embodiment, the optical unit is mounted to a circuit board (e.g., a printed circuit board (PCB)). In the example shown, wearable e-reader 100 comprises circuit board 140. In some embodiments, wearable e-reader 100 comprises two circuit boards to activate a display—for example, one circuit board for each eye of a user (e.g., circuit board 140 and another mounted behind angled backing 130 which is not visible in FIG. 1).

According to various embodiments, the optical units are configured to be positioned relative to a user's eye. For example, wearable e-reader 100 has the optical units configured to be angled out by about 5 degrees (e.g., angled away from a normal of the plane of the e-reader glasses frame lens/covers—for example, lens/covers 195 and 190—and away from the centerline of the glasses frame so that the eyes can angle toward the nose in a natural reading angle when viewing the displays head on such that the displays are perpendicular to an eye's viewing direction). In the example shown, wearable e-reader 100 comprises angled backing 130 and 135. The optical units are attached (either directly or indirectly such as via a circuit board—for example, circuit board 140) to angled backing 130 and 135. In some embodiments, the angled backing 130 and 135 are adjustable to adjust the angle of the optical units (e.g., the lenses). For example, angled backing 130 and 135 are configured to provide adjustment of alignment of the optical units between 0 degrees and 10 degrees. As another example, angled backing 130 and 135 are configured to provide adjustment of the alignment of the optical units between 0 degrees and 5 degrees. In some embodiments, the angled backing 130 and 135 are configured to provide an alignment with a 4-degree offset. In some embodiments, angled backing 130 and 135 are configured to adjust the different optical units by a same amount. In some embodiments, a surface of e-ink displays 125 and 126 are not parallel with a side of angled backing 130 and 135 opposite a side to which e-ink displays 126 and 126 are mounted. Humans are generally acclimated to focusing on objects at a close distance. For example, human eyes orient to a set of images at an angle offset to ensure convergence of the eyes to replicate viewing at near distances. In related art, virtual reality (VR) and augmented reality (AR) systems generally configure the displays/optical units to ensure that the user is looking to infinity. Accordingly, related art VR and AR systems do not enable adjustment (e.g., comprise an adjustment mechanism) of an angle offset of the optical units.

In some embodiments, as an alternative to enabling adjustment of an offset of the optical units, or in addition to such adjustment, wearable e-reader 100 offsets the images to achieve the same image tilt as is natural for being viewed by human eyes.

In some embodiments, the optical units (e.g., e-ink displays 125 and 126) are mounted to angled backing 130 and 135, and the circuit board(s) are comprised on (e.g., mounted to) an opposite side of angled backing 130 and 135. For example, in the example shown, e-ink display 126 is mounted to angled backing 135, and circuit board 140 is disposed on an opposite side of angled backing 135. A circuit board (e.g., circuit board 140) can be mounted (e.g., via adhesive, etc.) to angled backing 135. In some embodiments, e-ink display 126 is mounted to circuit board 140, which in turn is mounted to angled backing 135.

According to various embodiments, wearable e-reader 100 comprises a control system. As an example, the one or more modules include a processor. The control system is configured to store/manage content, provide a user interface, communicate with another device or network (e.g., via a wired connection or a wireless connection such as Bluetooth®, Wi-Fi, cellular, etc.), control the displays (e.g., provide a control to indicate to provide power to the displays, provide a control to indicate to provide content to be displayed by displays, etc.), etc. According to various embodiments, wearable e-reader 100 comprises one or more connectors between components such as a connector that connects the control system to a power source, a sensor (e.g., an ambient light sensor), one or more lights, a display, etc. In some embodiments, the one or more connectors comprises one or more flex cables (e.g., flex cables 137, 145, 150a, 150b). For example, in the example shown, wearable e-reader 100 comprises flex cable 145 that connects e-ink displays 125 and 126 to one or more circuit boards (e.g., circuit board 140) or otherwise interconnects the circuit boards for the left and right eyes. As another example, in the example shown, wearable e-reader 100 comprises flex cables 150a and 15b that respectively connect the circuit board(s) to power sources (e.g., batteries 160a and 160b). Flex cable 145 can comprise one or more mechanisms for stress relief. In the example shown, flex cable 145 comprises two holes, which are used for fastening the cable to the frame and to provide stress relief.

In some embodiments, the circuit board (e.g., circuit board 140) comprises the one or more control modules. The circuit board(s) also provide(s) (e.g., connects) power to the one or more control modules and displays.

Wearable e-readers according to various embodiments are significantly more power efficient than related art VR and AR systems. For example, e-ink displays 125 and 126 are more power efficient than displays in VR and AR systems. E-ink displays 125 and 126 do not require power driving to maintain an image. Accordingly, as a reader is reading a page of a content (e.g., a page of book), wearable e-reader 100 is not required to drive power to the displays. Wearable e-reader 100 can be configured to obtain a user input, or detect a user interaction, in connection with determining to change the content displayed on the displays (e.g., to turn the page of a book). In response to determining that the content displayed on the displays is to be changed, wearable e-reader 100 drives power to the displays to change the content.

According to various embodiments, wearable e-reader 100 comprises one or more batteries (e.g., batteries 160a and 160b) to provide power. In some embodiments, the batteries comprise 500 mAH batteries, or less. According to various embodiments, a power draw of wearable e-reader 100 is 15 mA or less at 4V. In some embodiments, batteries 160a and 160b are permanently housed in wearable e-reader 100, or alternatively, removably housed. In the example shown, batteries 160a and 160b are mounted to arms 155a and 155b.

In some embodiments, batteries 160a and 160b are rechargeable. In some embodiments, wearable e-reader 100 includes contact points that enable recharging when a charging current is provided to the contact points (e.g., by placing wearable e-reader 100 onto a stand or holder with contacts to put charging contacts of a stand or holder in electrical connection with the contact points). In some embodiments, wearable e-reader 100 comprises one or more solar panels. The one or more solar panels may be disposed on the front of the glasses, on a side of the glasses, and/or on one or more of the arms on the glasses, etc. Because of the low power consumption for operation of wearable e-reader 100, the batteries of wearable e-reader 100 may be sufficiently charged via ambient light even though indoor light is ten to one hundred times less powerful as compared to the sun or light outdoors.

Wearable e-reader 100 comprises arms 155a and 155b, which rest on a user's ears during use. As discussed above, arms 155a and 155b may comprise one or more batteries that provide power to the system. In some embodiments, arms 155a and 155b comprise a switch for powering on/off wearable e-reader 100. In the example illustrated in FIG. 1, wearable e-reader comprises one or more contacts (e.g., contact 152) between arms 155a and 155b and the control system (e.g., circuit board 140). In some embodiments, wearable e-reader 100 is configured to have a physical connect/disconnect mechanism based on a positioning of arms 155a and 155b, such as based on whether arms 155a and 155b are open or closed. As an example, if arms 155a and 155b are in an open position (e.g., to be worn by a user), a physical connection is made between an electrical contact on arms 155a and 155b and an electrical contact connected to the circuit board(s). For example, contact 152 electrically connects battery 160a with a connector (e.g., flex cable 150a), which in turn is electrically connected to power circuits on the circuit board(s) for the display. In some embodiments, wearable e-reader 100 is configured to have a magnetic-based mechanism to control the system (e.g., circuit board 140). This magnetic mechanism may, for example, be comprised of a hall-effect switch, digital magnetometer, or a magnetoresistive sensor. In some embodiments, the mechanism to control the system comprises a sensor to detecting touch to skin on the ears or nose as a method of powering on.

In some embodiments, an interpupillary distance (IPD) between lenses is adjustable. In the example shown in FIG. 1, wearable e-reader 100 comprises holding structure 170 that is configured to support adjustment screw 175 that adjusts the IPD between e-ink displays 125 and 126, and/or pancake lenses 105a and 105b. In some embodiments, adjustment screw 175 comprises a left-handed thread and a right-handed thread for individual adjustment of the corresponding locations of the respective lenses/displays. Adjustment of interpupillary distance enables wearable e-readers 100 to be comfortably used by a wider set of users. For example, one user's eyes are not as far apart as another user's eyes. In some embodiments, the mechanism for adjusting the interpupillary distance is configured to be between 58 mm-72 mm for a total range of 14 mm. In some embodiments, an asymmetry adjustment is included in e-reader 100 enabling the shifting of holding structure 170 towards one side or the other side. For example, a person's nose is not always in the center of their face (e.g., centered between the person's ears), or the pupillary distance between each eye may be asymmetrical.

In some embodiments, wearable e-reader 100 comprises inner molding 110. As illustrated in FIG. 1, inner molding 110 can be disposed between pancake lenses 105a and 105b and the inner moldings (e.g., inner molding 110 that provides light-shielding). Inner molding 110 can comprise a rubber. Inner molding 110 is configured to prevent moisture and/or dust from reaching e-ink displays 125 and 126.

Wearable e-reader 100 comprises one or more framing structures that provide support for the optical units. In the example shown, wearable e-reader 100 comprises framing structures 180, 185, and inner molding 110. Framing structures 180, 185, and inner molding 110 provide support for pancake lenses 105a and 105b, the light source, e-ink displays 125 and 126, and the circuit board(s) (e.g., circuit board 140).

Wearable e-reader 100 can be configured to be light-shielded. In the example shown, wearable e-reader 100 comprises inner moldings (e.g., inner molding 110). According to various embodiments, inner molding 110 is configured to block light or view into the inner structure of the e-reader. For example, inner molding 110 is disposed to prevent ambient light (or otherwise external light) from entering the field of view of wearable e-reader 100, which would cause diminished viewability of content being displayed by the displays.

According to various embodiments, wearable e-reader 100 comprises covers 190 and 195. Covers 190 and 195 provide further light-shielding. In some embodiments, if wearable e-reader 100 is a see-through design, then covers 190 and 195 permit light through. In the example shown, wearable e-reader 100 is light-shielding and covers 190 and 195 are opaque. Covers 190 and 195 may comprise one or more rails (e.g., rail 197) configured to guide motion of adjustable angled backing 130 and 135 that can be moved such as in connection with adjusting the interpupillary distance(s) (e.g., by turning knob at center of adjustment screw 175).

According to various embodiments, the control system of wearable e-reader 100 controls content being displayed on the displays. The control system controls operation of wearable e-reader 100 (e.g., a processor/user interface of the system) based on user input or based on detection of a user interaction. For example, wearable e-reader 100 may comprise one or more sensors that detect eye movement of users (e.g., eye-tracking sensor(s)) to enable control system to control operation of the system based on eye motion commands input by the user. As another example, wearable e-reader 100 may comprise one or more sensors that detect movement or placement of a hand, and the controls system uses such movement/placement of the hand to control operation of the system. In some embodiments, the controls system controls content displayed on the displays based at least in part on the user input and/or user interaction. For example, the control system controls are used to navigate the content (e.g., turn pages to advance a book, or to turn to a previous page, etc.). In various embodiments, the control system is used to control e-reader lighting, select content (e.g., a book title, an article, a magazine, etc.), delete content, adjust fonts, control magnification, or any other appropriate control for an e-reader. In some embodiments, control system receives indications from one or more buttons mounted on the glasses' frame (e.g., a button for turning a page forward, a button for turning a page back, a button for moving within a menu up, a button for moving within a menu down, a button for making a selection, a button for turning the system on/off, etc.).

In some embodiments, wearable e-reader 100 comprises one or more light sensors such as an ambient light sensor. In some embodiments, the control system controls the system based at least in part on the detected light. For example, the control system adjusts the power provided to the light sources (e.g., adjusts light emitted by the light sources) based on the level/extent of ambient or external light.

In some embodiments, wearable e-reader 100 is connected to a dongle or other external peripheral with which a user inputs a command (e.g., a user input) to wearable e-reader 100. For example, wearable e-reader 100 may be wirelessly connected to a hand-held wand that that is used to control operation of the system (e.g., to turn pages, to load content, etc.). In various embodiments, the dongle or other external peripheral communicate with wearable e-reader 100 (e.g., a circuit board, a controller or processor on the circuit board, etc.) via a wired connector, a wireless connection (e.g., Bluetooth, WiFi, infrared (IR), etc.), or any other appropriate communication connection.

Figure 2:
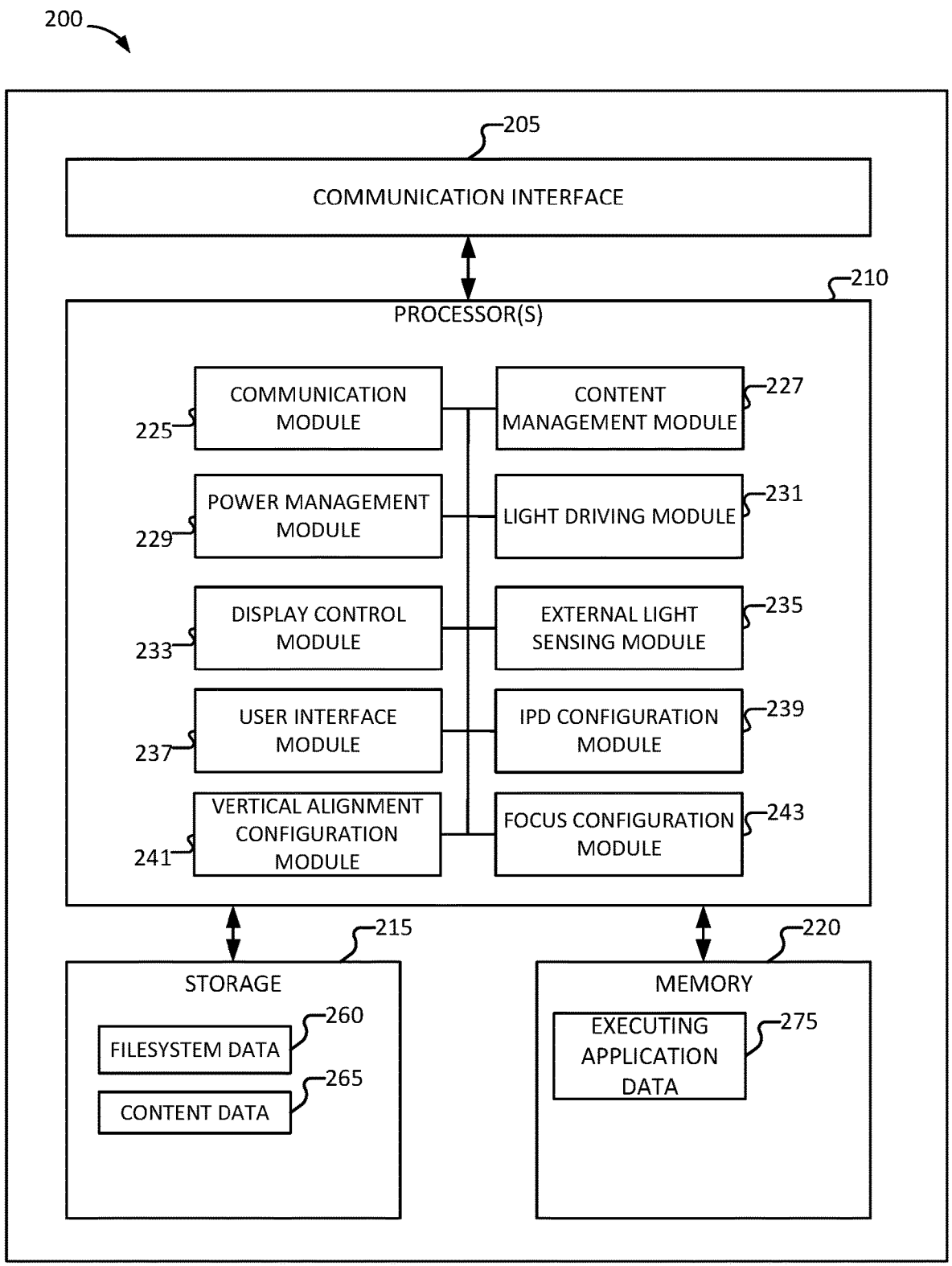
FIG. 2 is a block a diagram of a system according to various embodiments of the present application.

FIG. 2 is a block a diagram of a system according to various embodiments of the present application. In some embodiments, system 200 implements at least part of wearable e-reader 100.

In the example shown, system 200 implements one or more modules in connection with managing and displaying content (e.g., displaying content for a wearable e-reader). System 200 comprises communication interface 205, one or more processors 210, storage 215, and/or memory 220. One or more processors 210 comprises, or implements, one or more of communication module 225, content management module 227, power management module 229, light driving module 231, display control module 233, external light sensing module 235, user interface module 237, IPD configuration module 239, vertical alignment configuration module 241, and/or focus configuration module 243. Although the example shown in FIG. 2 illustrates IPD configuration module 239, vertical alignment configuration module 241, and focus configuration module 243 as separate modules, the functionality of IPD configuration module 239, vertical alignment configuration module 241, and/or focus configuration module 243 may be integrated into a single module, such as a configuration workflow module (not shown). In various embodiments, system 200 comprises additional configuration modules, or additional functionality in the configuration workflow module, for configuring various other settings for the wearable e-reader.

In some embodiments, system 200 comprises communication module 225. System 200 uses communication module 225 to communicate with various other systems such as peripheral device (e.g., a hand-held wand), a smartphone, a tablet, a laptop, etc. For example, communication module 225 provides to communication interface 205 information that is to be communicated. As another example, communication interface 205 provides to communication module 225 information received by system 200. Communication module 225 is configured to receive user input from the other system, or to download content to local storage (e.g., storage 215) of system 200.

In some embodiments, system 200 comprises content management module 227. System 200 uses content management module 227 to manage content to be downloaded/stored on system 200. For example, content management module 227 interfaces with a web service or application running on a peripheral to navigate a library of content or to otherwise obtain (e.g., download, receive via push, etc.) content. In some embodiments, content management module 227 manages user profiles for one or more users associated with (e.g., registered with) system 200. The user profile may include information pertaining to user preferences, configuration settings (e.g., IPD configuration settings, vertical alignment configuration settings, focus configuration settings, etc.).

In some embodiments, system 200 comprises power management module 229. System 200 uses power management module 229 to manage power distributed to different components of system 200. For example, power management module 229 is used to drive the displays. Power management module 229 can provide power to the displays at least when content to be displayed thereon is changed. In some embodiments, power management module 229 ceases providing power to the displays when content is not being changed. As another example, power management module 229 is used to provide power to the light source(s). Power management module 229 can adjust the amount of power provided to the light source(s) based on a level setting of ambient/external light.

According to various embodiments, power management module 229 detects when system 200 is powered on (e.g., when the frame arms are opened, when the wearable e-reader is worn by a user, when a power button is turned on, etc.). In response to detecting that system 200 is powered on, power management module 229 may provide an indication of such to a configuration module, such as one or more of IPD configuration module 239, vertical alignment configuration module 241, focus configuration module 243, and/or another configuration module such as configuration workflow module. System 200 may determine whether to perform a configuration workflow (e.g., a process for setting/initializing various configurations for system 200) based at least in part on when system 200 is powered on. For example, in response to being powered on, system 200 may determine whether to run the configuration workflow based on whether system 200 has previously been initialized or based on a determination that a setting of system 200 is reset, or a determination that another user is using system 200.

In some embodiments, system 200 comprises light driving module 231. System 200 uses light driving module 231 to control a light source. In some embodiments, light driving module 231 controls the light source based on an input from power management module 229, such as an indication of an extent of light to be emitted (e.g., a brightness) based on ambient/external light.

In some embodiments, system 200 comprises display control module 233. System 200 uses display control module 233 to control content to be displayed on the displays of the wearable e-reader. Display control module 233 provides content to the displays for display. In some embodiments, display control module 233 controls content to be displayed on the displays (or provided to the displays) based on a received user input or a detected user interaction, such as a command to turn a page or otherwise change content being displayed. In some embodiments, system 200 uses display control module 233 in connection with performing the configuration workflow or otherwise configuring various settings (e.g., IPD, vertical alignment, focus, etc.). For example, system 200 uses display control module 233 to display instructions or other content, or toggle the displays on/off, during the configuration of system 200.

In some embodiments, system 200 comprises external light sensing module 235. System 200 uses external light sensing module 235 to detect (e.g., receive from a light sensor(s)) an ambient or external light. External light sensing module 235 determines a level/extent of the ambient or external light and provides an indication of such information to power management module 229 and/or light driving module 231.

In some embodiments, system 200 comprises user interface module 237. System 200 uses user interface module 237 to configure and provide a user interface to a user. The user interface can be displayed on the displays, such as by content management module 227 and/or display control module 233. User interface module 237 can configure a user interface that provides menus to navigate content or user settings/preferences. A user may interact with the user interface via a peripheral, a button, or other sensor on the system (e.g., a button on the arms of the glasses, an eye-tracking sensor, etc.).

In some embodiments, system 200 comprises IPD configuration module 239. System 200 uses IPD configuration module 239 in connection with configuring the IPD for a user of system 200. For example, IPD configuration module 239 may invoke process 1200 of FIG. 12, process 1300 of FIG. 13, process 1400 of FIG. 14, etc. IPD configuration module 239 may be configured to implement a plurality of configuration processes, such as based on a user selection/preference for a particular method.

In some embodiments, the first IPD configuration method comprises placing lens caps over the lenses/optical units, and system 200 (e.g., display control module 233) controls to display predefined content on the displays such as to serve as a reference for a user as the IPD is adjusted to ensure that the predefined content is viewable through the holes/cutouts (e.g., a pinhole) of the lens caps. An example of the first IPD configuration method is described in connection with FIGS. 3A-3E. In some embodiments, system 200 is packaged in a manner that the lens caps are pre-configured/positioned to be on the lenses/optical units when a user opens the package for a first time. A lens cap may be further used as a lens protector after the initialization/configuration of the IPD for the user.

In some embodiments, an IPD configuration method (e.g., the second IPD configuration method) comprises alternating turning on/off the displays while the IPD and/or focus is adjusted for a particular eye. For example, during configuring of the IPD/focus for a left eye, system 200 controls to turn on the left display and turn off the right display. System 200 then controls to display predefined content on the left display. A left IPD adjustment mechanism and/or left focus adjustment mechanism is actuated to adjust the configuration of the IPD and/or focus for the left eye. In some embodiments, in response to determining the IPD configuration setting and/or focus setting for a first eye (e.g., the left eye), system 200 automatically adjust the IPD configuration setting and/or focus setting for the second eye (e.g., the right eye). For example, system 200 may control one or more motors (e.g., servos) to adjust the IPD configuration setting and/or focus setting for the second eye. In some embodiments, in response to determining the IPD configuration setting and/or focus setting for a first eye (e.g., the left eye), system 200 then controls to turn off the left display, turn on the right display, and display predefined content on the right display while the IPD configuration setting and/or focus setting for the right eye are configured.

In some embodiments, an IPD configuration method (e.g., the second IPD configuration method) may include placing system 200 on (e.g., putting the wearable e-reader on a user's face), and alternating display of a content, such as a predefined image, on the various displays (e.g., the first/left display and the second/right display). For example, the system 200 alternately turns on/off a first display and a second display so that predefined content is displayed on a single display at a time. The IPD adjustment mechanism is adjusted (e.g., manually or automatically by controlling motors or other actuating device) while the first display and second display are alternately displaying the predefined content until the images are lined up (e.g., so that the images respectively viewable from the left eye and right eye do not overlap).

In some embodiments, an IPD configuration method includes displaying predefined content on the first display and the second display, and the user alternatively winking/blinking an eye while the IPD adjustment mechanism is adjusted until the predefined content displayed on the first display and the second display are lined up (e.g., do not overlap).

An IPD configuration method may include one or more sensors that obtain information from which the eyes or facial structure of a user is measured, and system 200 controls one or more motors, such as servos, to automatically adjust the IPD.

The IPD may be configured based on adjusting both eyes at the same time, such as via a single IPD adjustment mechanism, or adjusting both eyes separately using different IPD adjustment mechanisms for the optical units (e.g., a left IPD adjustment mechanism and a right IPD adjustment mechanism).

A user may input a user input to system 200 (e.g., via a peripheral device such as a remote device or mobile device paired to system 200 or forming a predefined eye movement) an indication that the IPD configuration is complete. System 200 may then determine whether any other configuration settings are to be configured.

In some embodiments, system 200 comprises vertical alignment configuration module 241. System 200 uses vertical alignment configuration module 241 in connection with configuring the vertical alignment for a user of system 200. For example, in response to determining that the optical units are to be vertically aligned, system 200 controls the first display and the second display (e.g., left and right displays) to display predefined content. While the predefined content is being displayed, a vertical alignment adjustment mechanism is actuated (e.g., manually by a user or automatically using system control of a motor or other actuating device) until the predefined content on the first display and the second display are vertically aligned. An example of a vertical alignment configuration method implemented at least in by vertical alignment configuration module 241 is described in connection with FIGS. 5A and 5B. Another example of a vertical alignment configuration method is process 1500 of FIG. 15.

A user may input a user input to system 200 (e.g., via a peripheral device such as a remote device or mobile device paired to system 200 or forming a predefined eye movement) an indication that the vertical alignment configuration is complete. System 200 may then determine whether any other configuration settings are to be configured.

In some embodiments, system 200 comprises focus configuration module 243. System 200 uses focus configuration module 243 in connection with configuring the focus for a user of system 200. For example, in response to determining that the optical units are to be focused, system 200 controls the first display and the second display (e.g., left and right displays) to display predefined content. While the predefined content is being displayed, a focus adjustment mechanism is actuated until the predefined content is viewable as focused. An example of a focus adjustment method is described in connection with FIGS. 4A-4C. Another example of a focus adjustment method is described in connection with process 1600 of FIG. 16. Another example of a focus adjustment method is described in connection with process 1700 of FIG. 17.

A user may input a user input to system 200 (e.g., via a peripheral device such as a remote device or mobile device paired to system 200 or forming a predefined eye movement) an indication that the focus configuration is complete. System 200 may then determine whether any other configuration settings are to be configured.

According to various embodiments, storage 215 comprises one or more of filesystem data 260 and/or content data 265. Storage 215 may be a solid-state device (SSD) memory, which is lightweight and/or power-efficient and has a small form factor.

In some embodiments, filesystem data 260 comprises information such as user settings, user information, account information, network settings, communication settings, user preferences (e.g., light brightness, font size, etc.). Filesystem data 260 may store information pertaining to user profiles, such as configuration settings for various configurations such as a position/value corresponding to the IPD adjusting mechanism, position/value corresponding to the focus adjusting mechanism, and/or the vertical alignment adjusting mechanism. System 200 may display the user profile and associated configuration settings for the user to be able to quickly readjust the corresponding adjusting mechanisms to bring system 200 back into the pre-determined configuration for the user (e.g., after another user has used system 200 and changed the configurations such as IPD, a user may want to quickly perform a lookup of its configuration settings so the user can adjust the adjusting mechanisms without performing the configuration workflow for the settings).

In some embodiments, content data 265 comprises content downloaded to system 200. For example, content comprises a catalog of one or more books, articles, magazines, newspapers, etc.

According to various embodiments, memory 220 comprises executing application data 275. Executing application data 275 comprises data obtained or used in connection with executing an application such as an application executing in connection with providing content to be read on the displays of the e-reader, or an application executing in connection with obtaining new content, managing content stored on system 200, etc.

Figure 3A:
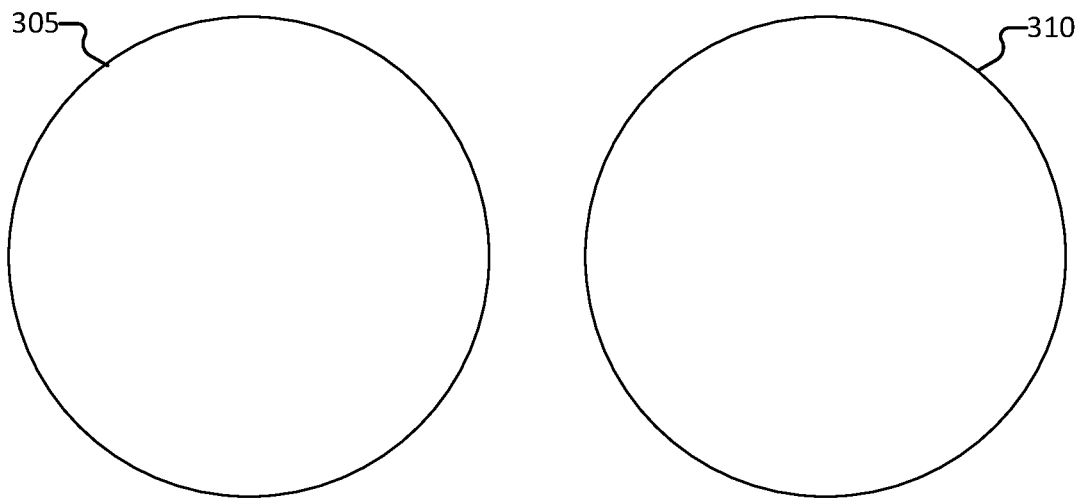
FIG. 3A is a diagram illustrating a display viewable through lenses of a wearable e-reader according to various embodiments of the present application.
Figure 3B:
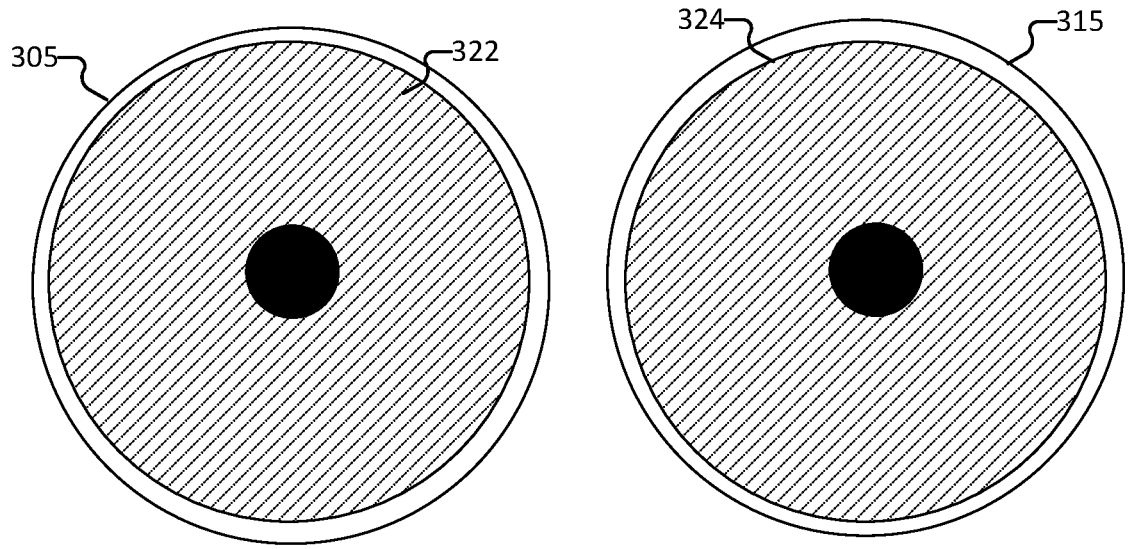
FIG. 3B is a diagram illustrating a display viewable through lenses of a wearable e-reader configured with lens caps according to various embodiments of the present application.
Figure 3C:
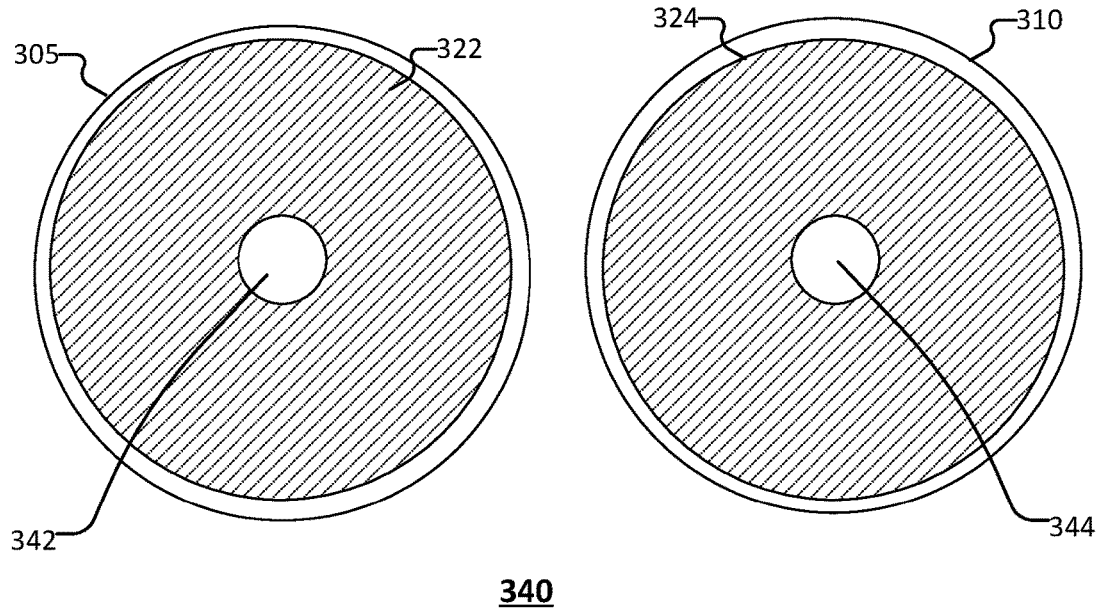
FIG. 3C is a diagram illustrating a display viewable through lenses of a wearable e-reader configured with lens caps according to various embodiments of the present application.
Figure 3D:
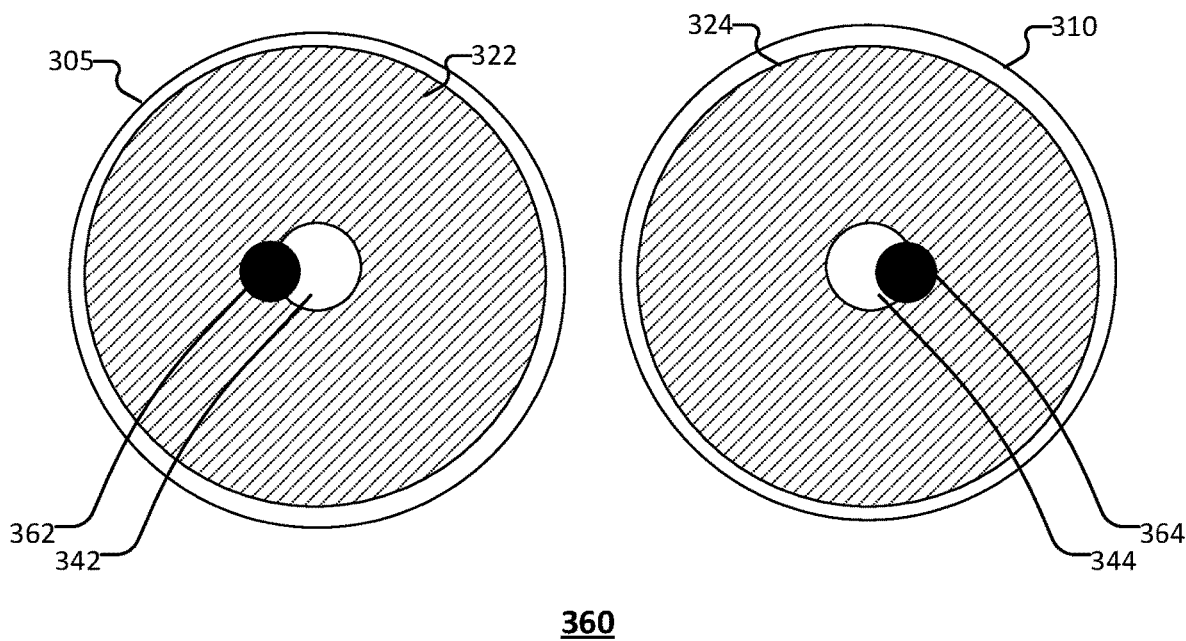
FIG. 3D is a diagram illustrating a display viewable through lenses of a wearable e-reader configured with lens caps running an interpupillary distance (IPD) configuration according to various embodiments of the present application.
Figure 3E:
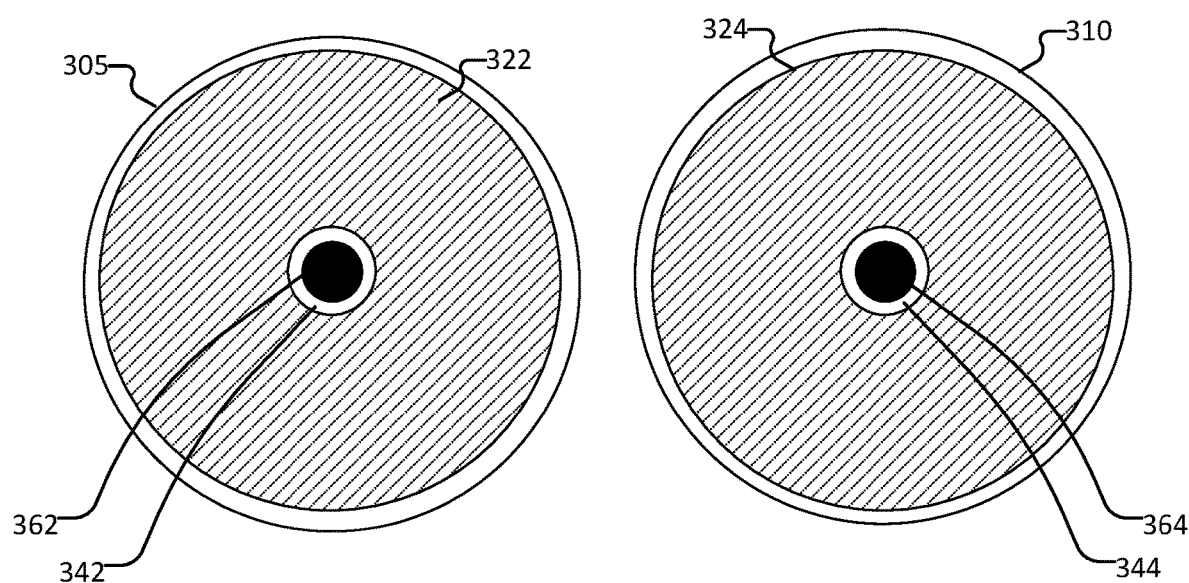
FIG. 3E is a diagram illustrating a display viewable through lenses of a wearable e-reader configured with lens caps running an interpupillary distance (IPD) configuration according to various embodiments of the present application.

FIG. 3A is a diagram illustrating a display viewable through lenses of a wearable e-reader according to various embodiments of the present application. FIG. 3B is a diagram illustrating a display viewable through lenses of a wearable e-reader configured with lens caps according to various embodiments of the present application. FIG. 3C is a diagram illustrating a display viewable through lenses of a wearable e-reader configured with lens caps according to various embodiments of the present application. FIG. 3D is a diagram illustrating a display viewable through lenses of a wearable e-reader configured with lens caps running an interpupillary distance (IPD) configuration according to various embodiments of the present application. FIG. 3E is a diagram illustrating a display viewable through lenses of a wearable e-reader configured with lens caps running an interpupillary distance (IPD) configuration according to various embodiments of the present application.

In the examples shown in FIGS. 3A-3E, the system performs a configuration for the IPD. At 300, first display 305 (e.g., the left display) and second display 310 are powered on. For example, first display 305 and second display 310 display a white screen, or such other default screen. In response to determining that the system is powered on, the system determines whether to perform a configuration workflow. For example, the system determines whether to configure the IPD.

In response to determining whether to configure the IPD, a process for configuring the IPD may be executed. At 320, the system controls to turn off or display no content (e.g., display a white or black screen) on first display 305 and second display 315. First lens cap 322 is positioned over the first lens corresponding to first display 305 (e.g., placed on the first lens) and second lens cap 324 is positioned over the second lens corresponding to second display 310. Although first lens cap 322 and second lens cap 324 are respectively illustrated as being smaller than first display 305 or second display 315 (e.g., smaller than the viewable area via the first lens and the second lens) in the example shown in FIGS. 3B-3E, lens caps may entirely cover the lenses (e.g., the lens caps may be larger than the respective lens on which they are placed).

At 320, the system controls first display 305 and second display 310 to display no content. For example, no information or images are present through the holes cutout of lens caps 322 and 324 (illustrated as the solid black dots).

At 340, the system controls to turn on one or more of first display 305 and second display 310. For example, the system controls first display 305 and second display 310 to display white, which is viewable through holes 342 and 344 at the center of lens caps 322 and 324, respectively.

At 360, the system controls to display predefined content on first display 305 and second display 310. Various types of shapes, patterns, text, etc. may be implemented as the predefined content. In the example shown, the system controls first display 305 to display first predefined content 362 and controls second display 310 to display second predefined content 364. For example, first predefined content 362 and second predefined content 364 are dots that are displayed. The system or user may determine that the IPD is to be configured because first predefined content 362 and/or second predefined content 364 are not entirely visible through holes 342 and 344, respectively. For example, first predefined content 362 and second predefined content 364 are misaligned horizontally with holes 342 and 344 (e.g., pinholes), respectively.

In connection with performing the IPD configuration, the system is adjusted until first predefined content 362 and second predefined content 364 are viewable through holes 342 and 344 (e.g., the entireties of first predefined content 362 and second predefined content 364 are viewable). For example, referring to FIG. 1, the user may adjust adjustment screw 175 that adjusts the interpupillary distance between e-ink displays 125 and 126. Adjustment screw 175 may be actuated until first predefined content 362 and second predefined content 364 are viewable through holes 342 and 344, respectively, at 380.

Figure 4A:
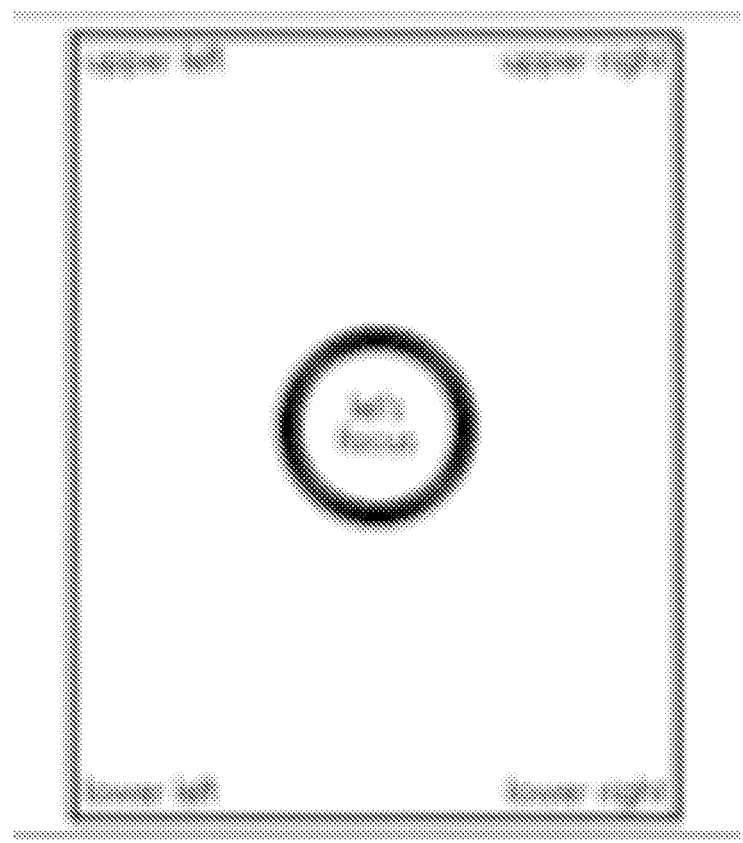
FIG. 4A is a diagram illustrating a display of a wearable e-reader during configuration of a focus of at least one lens according to various embodiments.
Figure 4B:
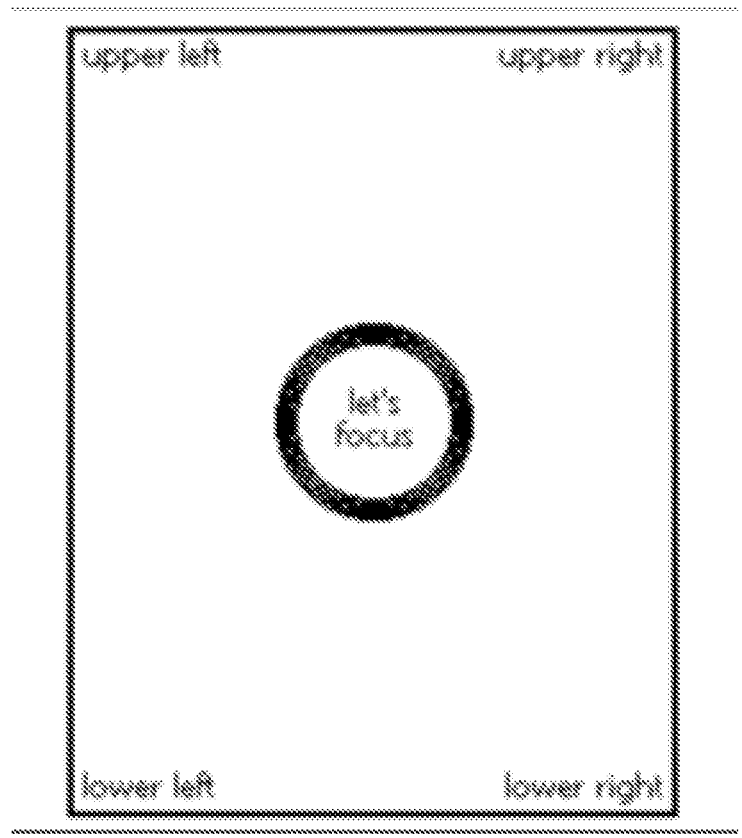
FIG. 4B is a diagram illustrating a display of a wearable e-reader during configuration of a focus of at least one lens according to various embodiments.
Figure 4C:
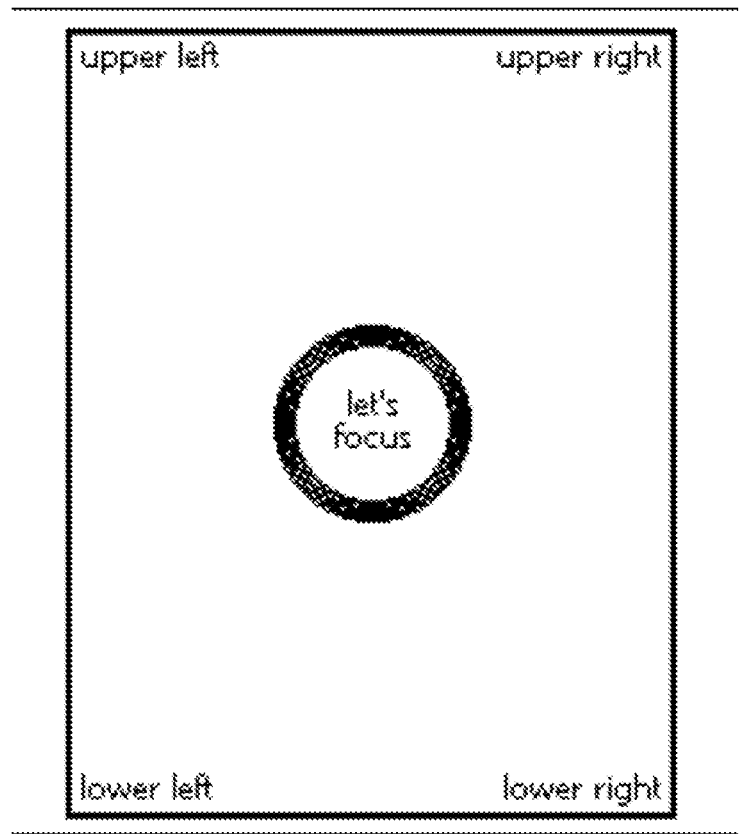
FIG. 4C is a diagram illustrating a display of a wearable e-reader during configuration of a focus of at least one lens according to various embodiments.

FIG. 4A is a diagram illustrating a display of a wearable e-reader during configuration of a focus of at least one lens according to various embodiments. FIG. 4B is a diagram illustrating a display of a wearable e-reader during configuration of a focus of at least one lens according to various embodiments. FIG. 4C is a diagram illustrating a display of a wearable e-reader during configuration of a focus of at least one lens according to various embodiments.

In the examples shown in FIGS. 4A-4C, content presented by the system (e.g., the wearable e-reader) is progressively focused. In some embodiments, the system comprises a focus adjusting mechanism (e.g., a focus adjuster) on one or more of the optical units. The focus adjusting mechanisms may respectively adjust the focus for a lens of the system (e.g., of the optical unit(s)). As an example, lenses within the system may comprise a dial or ring that is actuated/manipulated to change the focus (e.g., the focal length, focal distance, etc.) of the lenses. With reference to FIG. 1, the knurled ring (e.g., closest to the user eye) of pancake lenses 105a and 105b may correspond to the focus adjusting mechanism, and pancake lenses 105a and 105b may be adjusted by rotation of the knurled ring closest to the user eye.

FIGS. 4A-4C illustrate a progressive focusing of content displayed by the system. For example, FIGS. 4A-4C correspond to a sequence of focusing a particular lens of the system. In the example shown in FIG. 4A, content 400 displayed by the system is unfocused. For example, content 400 is generally unreadable.

In response to actuating/manipulating the focus adjusting mechanism, the focus of the lens with respect to the content is adjusted. In the example shown in FIG. 4B, content 425 displayed by the system is partially focused. For example, content 425 is generally legible, however, content 425 is still unfocused to a certain degree. Accordingly, the focus adjusting mechanism may be further actuated. As the focus adjusting mechanism is further actuated, the content is brought further into focus. For example, content 450 of FIG. 4C is presented as focused. The system or user may then determine that the focus configuration is complete. For example, the user may provide to the system an indication that the wearable e-reader is focused.

In some embodiments, the system comprises a focus adjuster gauge that is indicative of a setting of the focus adjusting mechanism, such as an extent to which the focus adjusting mechanism (e.g., the knurled ring of pancake lenses 105a, 105b) is actuated. For example, the focus adjuster gauge may comprise physical hash marks with reference information (e.g., reference values) indicating a setting of the focus adjusting mechanism. The system may store the reference information (e.g., the reference values) for the focus adjusting mechanism as a focus configuration setting for the user of the system. This information may be stored in a user profile managed/stored by the system.

Figure 4D:
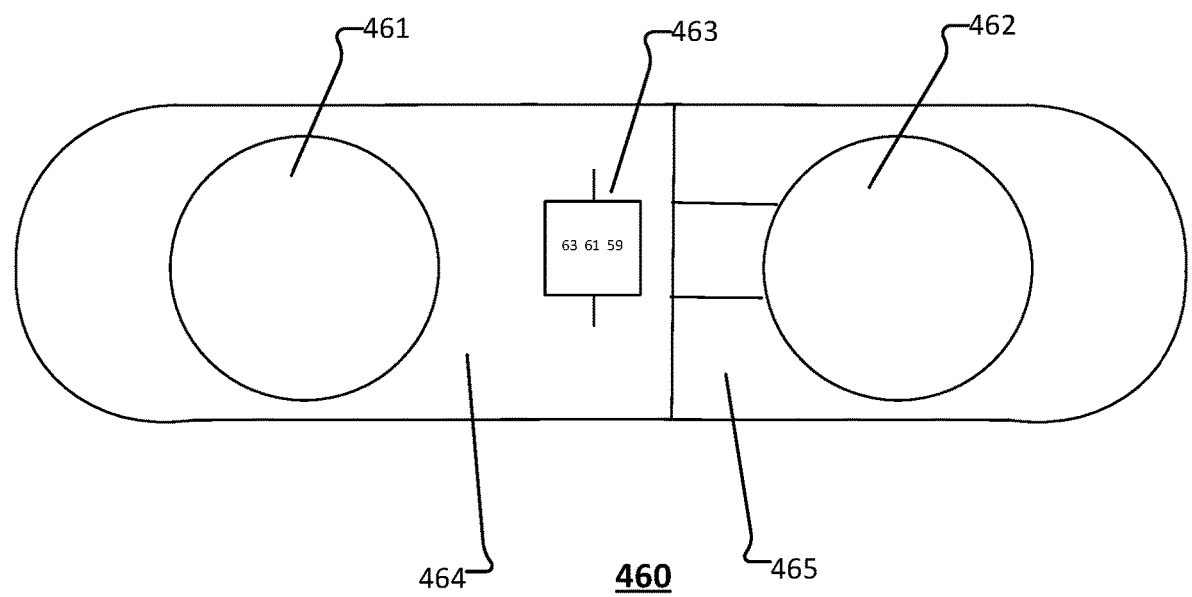
FIG. 4D is a diagram illustrating an embodiment of an IPD measurement gauge or device.

FIG. 4D is a diagram illustrating an embodiment of an IPD measurement gauge or device. In the example shown in FIG. 4D, two-piece card 460 includes two holes (e.g., hole 461 and hole 462) that can be adjusted to a particular distance and then placed over e-reader glasses lenses so that the lenses of the glasses can be set to match the particular distance by matching the lenses to the set two holes of two-piece card 460. Hole 461 in piece 464 slides with respect to hole 462 in piece 465. When sliding, different numbers are visible in window 463 indicating the IPD which are a measure of the distance between the centers of the two holes. In some embodiments, an application can be used on a phone to scan a face (e.g., your own face). In various embodiments, the facial geometry can be determined by using computer vision computations, lidar, dot projectors, or other structured light, or any other appropriate manner of measuring or determining facial geometry. The application can then calculate an IPD setting and/or a vertical alignment setting for the e-reader glasses. In some embodiments, the e-reader glasses receive the IPD setting and/or the vertical alignment setting (e.g., via a wireless communication signal) and using these settings set the IPD and the vertical alignment. In some embodiments, the glasses are scanned using the application and a current setting for the e-reader is measured. In some embodiments, instructions are provided to the user on how to modify the current IPD and vertical alignment to correspond to the determined IPD and vertical alignment settings for the user. For example, the user is provided instructions on using the two-piece card to set the correct IPD as specified by the application (e.g., by adjusting the card IPD to the indicated value and adjusting the glasses IPD to match the card apertures distance between the two holes with the lens positions of the e-reader glasses). As another example, the user is provided instructions on installing a correct nosepiece as specified by the application (e.g., by removing a current nose piece and installing the application determined nosepiece). In some embodiments, the e-reader glasses are rescanned to determine whether the settings have been modified appropriately (e.g., to the calculated IPD setting and/or the appropriate nose piece to achieve the vertical alignment setting).

Figure 4E:
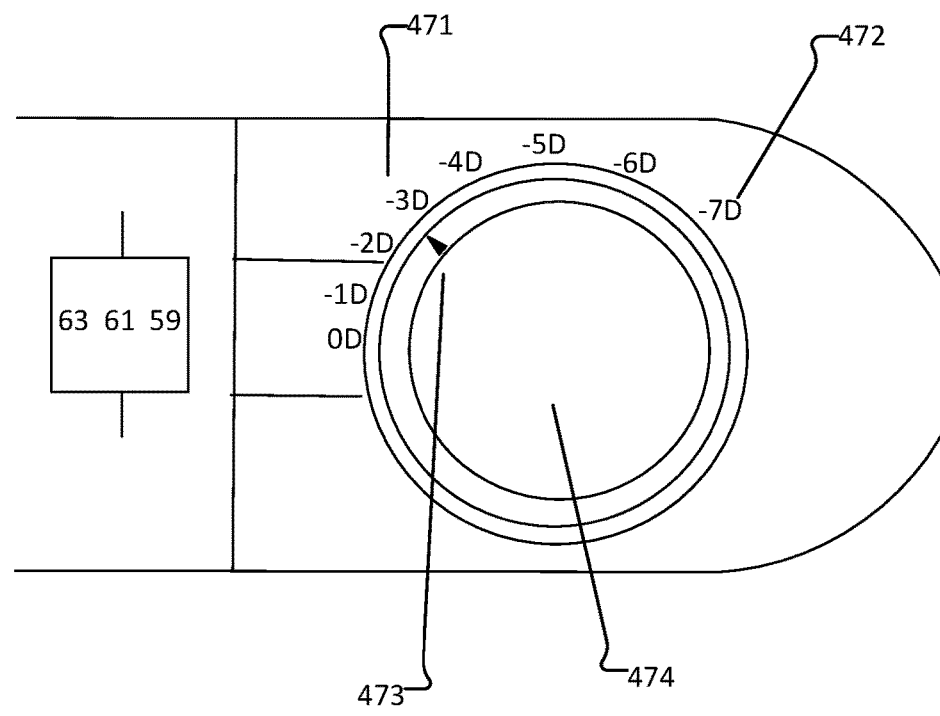
FIG. 4E is a diagram illustrating an embodiment of a focus gauge or device.

FIG. 4E is a diagram illustrating an embodiment of a focus gauge or device. In the example shown in FIG. 4E, one aperture of two piece card 470 includes diopter markings (e.g., 0D, −1D, −2D, −3D (diopter marking 471), −4D, −5D, −6D, −7D (diopter marking 472)). These diopter markings can be used by a user to set the focus of the e-reader glasses lens (e.g., lens 474) to a setting associated with a user's prescription. For example, a user has a prescription of −3D for an eye associated with the lens 474 and the user can rotate lens 474 until the has mark 473 on lens 474 is aligned with the appropriate diopter marking—diopter marking 471 (e.g., −3D).

Figure 5A:
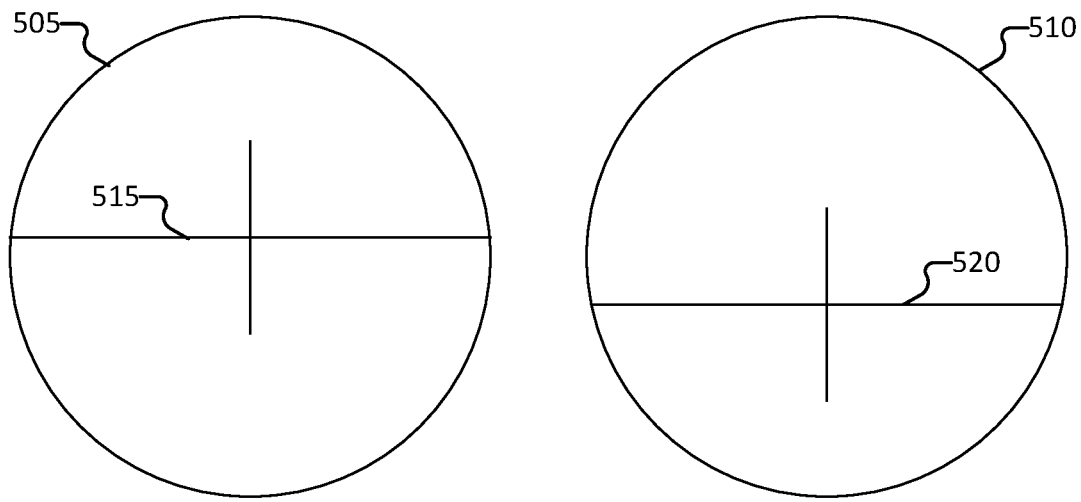
FIG. 5A is a diagram illustrating a display of a wearable e-reader during vertical alignment configuration according to various embodiments.

FIG. 5A is a diagram illustrating a display of a wearable e-reader during vertical alignment configuration according to various embodiments. In the example shown, the wearable e-reader comprises left viewable area 505 corresponding to the left display for the left optical unit, and right viewable area 510 corresponding to the right display for the right optical unit. During the vertical alignment configuration process, the system controls the left display and the right display to display first display content 515 (e.g., left display content) and second display content 520 (e.g., right display content).

The display content displayed during the vertical alignment process can comprise various types of information, such as text, shapes, patterns, etc. The display content may be configured to enable a user to easily and efficiently determine whether the content displayed on the different displays are aligned. Vertical alignment of the information presented on the displays ensures that users are able to view/read the information without undue strain on their eyes.

As illustrated in FIG. 5A, first display content 515 and/or second display content 520 comprises an element that extends horizontally to promote the determination that the information/content is vertically aligned. First display content 515 and second display content 520 are displayed in a manner in which they are not-vertically aligned. The vertical alignment adjuster may be actuated to adjust the vertical alignment of the content on the first display and the second display.

Figure 5B:
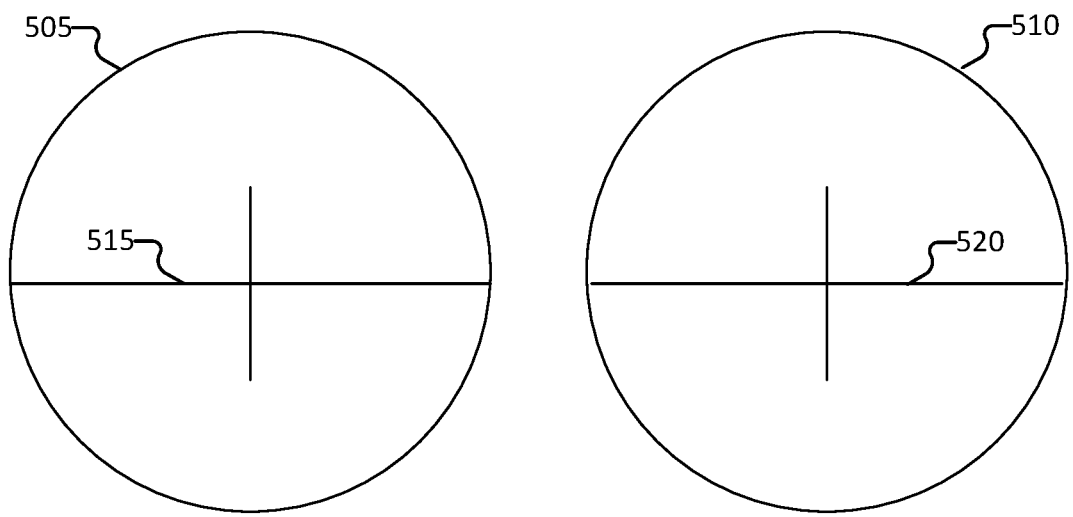
FIG. 5B is a diagram illustrating a display of a wearable e-reader during vertical alignment configuration according to various embodiments.

FIG. 5B is a diagram illustrating a display of a wearable e-reader during vertical alignment configuration according to various embodiments. In the example shown, first display content 515 and second display content 520 are vertically aligned. For example, the horizontal elements of first display content 515 and second display content 520 are substantially on the same axes/plane.

Figure 6A:
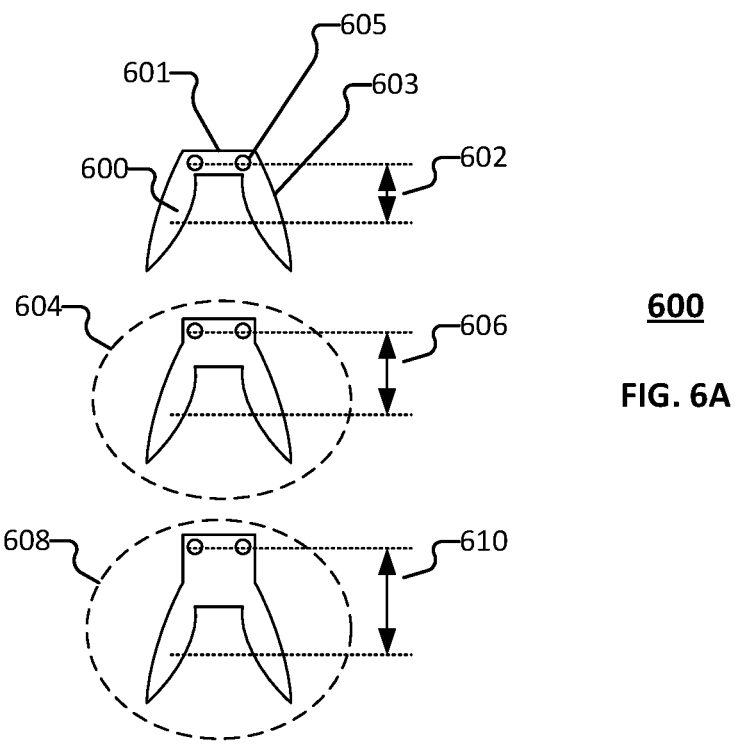
FIG. 6A is a diagram illustrating an embodiment of a height adjustment using changeable nose pieces for the wearable e-reader.

FIG. 6A is a diagram illustrating an embodiment of a height adjustment using changeable nose pieces for the wearable e-reader. In the example shown, a first nose piece comprises left pad 600, right pad 603, connector 601, and two mounting holes (e.g., mounting hole 605). The first nose piece has height distance 602 between center of left pad 600 and right pad 603 and the two mounting holes. Second nose piece 604 comprises a left pad, a right pad, a connector, and two mounting holes. Second nose piece 604 has height distance 606 between center of the left pad and the right pad and the two mounting holes. Third nose piece 608 comprises a left pad, a right pad, a connector, and two mounting holes. Third nose piece 608 has height distance 610 between center of the left pad and the right pad and the two mounting holes. In the examples shown, height distance 602 is less than height distance 606 which is less than height distance 610.

Figure 6B:
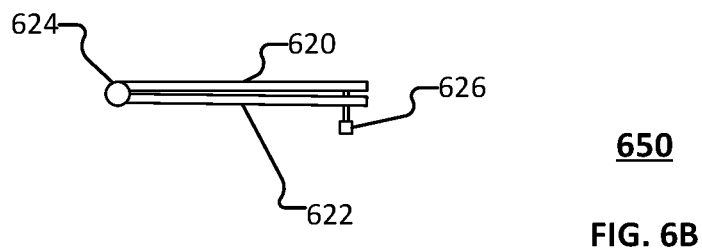
FIG. 6B is a diagram illustrating an embodiment of a tilt adjuster for displays using set screws for a wearable e-reader.

FIG. 6B is a diagram illustrating an embodiment of a tilt adjuster for displays using set screws for a wearable e-reader. In the example shown, plate 620 and plate 622 that are attached to hinge 624. Hinge 624 enables an angle offset between plate 620 and plate 622. The angle can be adjusted using screw 626. In some embodiments, one plate is attached to an optical display and the other plate is attached to the adjustable mount to enable angling displays to the eyes.

In some embodiments, vertical alignment of the first display and second display (e.g., information displayed on the left display and the right display) may be controlled based on manipulating/actuating the nose pieces. For example, the user may replace the nose piece with a nose piece that more appropriate fits the user's face. As another example, the nose piece may be composed of rubber or other deformable/shapeable material (e.g., a bendable wire), and the user may deform/shape the nose piece such that the displays are vertically aligned.

In some embodiments, the system comprises a vertical alignment gauge that is indicative of a setting of the vertical alignment adjusting mechanism (e.g., a shape of the nose piece, etc.), such as an extent to which the vertical alignment adjusting mechanism is actuated, or information indicative of a position of the vertical alignment adjusting mechanism. For example, the vertical alignment gauge may comprise physical hash marks with reference information (e.g., reference values) indicating a setting of the vertical alignment adjusting mechanism. The system may store the reference information (e.g., the reference values) for the vertical alignment adjusting mechanism as a vertical alignment configuration setting for the user of the system. This information may be stored in a user profile managed/stored by the system.

Figure 7:
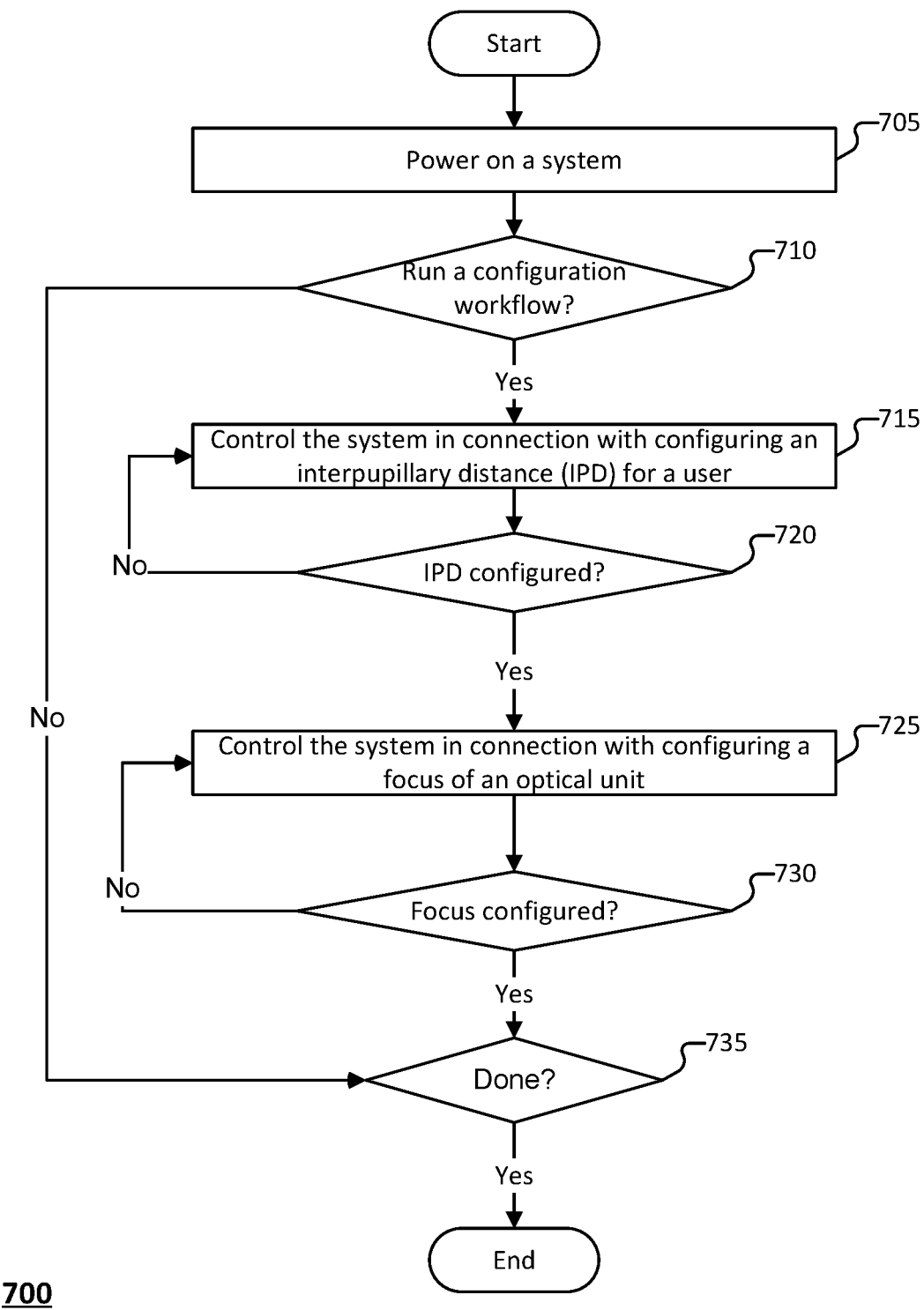
FIG. 7 is a flow diagram illustrating a process for configuring a wearable e-reader according to various embodiments.

FIG. 7 is a flow diagram illustrating a process for configuring a wearable e-reader according to various embodiments. According to various embodiments, process 700 is implemented at least in part by wearable e-reader 100 of FIG. 1 and/or system 200 of FIG. 2.

At 705, a system is powered on. In the example shown, the wearable e-reader is powered on, such in response to a user pressing a button, an electrical connection being made by opening arms of the wearable e-reader, or the wearable e-reader detecting that the wearable e-reader is positioned on a user's face.

At 710, the system determines whether to run a configuration workflow. The system may determine whether to run the configuration workflow based on a determination of whether the system has already been configured/initialized. For example, the first time the system is powered on (or first time that the system is powered on without the configuration workflow having been completed) the system determines to run the configuration workflow. The system may also determine whether to run the configuration workflow based on a user input. For example, a user may provide a user input to skip the configuration workflow. As another example, the user may provide a user input to begin/continue the configuration workflow.

In response to determining that the configuration workflow is not to be run at 710, process 700 proceeds to 735. Conversely, in response to determining that the configuration workflow is to be run at 710, process 700 runs the configuration workflow. For example, process 700 proceeds to 715 at which the system is controlled in connection with configuring an IPD for a user. The IPD may be configured by invoking process 1200 of FIG. 12, process 1300 of FIG. 13, and/or process 1400 of FIG. 14.

At 720, the system determines whether the IPD is configured. The system may determine that the IPD is configured based on user input, such as a user input to a peripheral device (e.g., a remote device or mobile device that is paired with the wearable e-reader system).

In response to determining that the IPD is not configured at 720, process 700 returns to 715 and process 700 iterates over 715-720 until the system determines that the IPD is configured (or until a user exits the configuration workflow or turns off the wearable e-reader). Conversely, in response to determining that the IPD is configured at 720, the configuration workflow may continue. In the example shown, in response to determining that the IPD is configured, process 700 may proceed to 725 at which the system is controlled in connection with configuring a focus of an optical unit. In some embodiments, configuring the focus of the optical unit includes invoking process 1600 of FIG. 16 and/or process 1700 of FIG. 17.

At 730, the system determines whether the focus of the wearable e-reader is configured. The system may determine whether the system is focused based at least in part on a user input. For example, the user may input a user input to a peripheral device (e.g., a remote device or mobile device that is paired with the wearable e-reader system) indicating whether the system is focused (e.g., the user selects a selectable element or otherwise indicates that the content displayed on the display(s) is focused).

In response to determining that the focus is not configured at 730, process 700 returns to 725 and process 700 iterates over 725-730 until the system determines that the focus is configured (or until a user exits the configuration workflow or turns off the wearable e-reader). Conversely, in response to determining that the focus is configured at 730, process 700 proceeds to 735.

At 735, a determination is made as to whether process 700 is complete. In some embodiments, process 700 is determined to be complete in response to a determination the configuration of the wearable e-reader has configured, a user has exited the system, a user indicates that process 700 is to be paused or stopped, the wearable e-reader is powered off, etc. In response to a determination that process 700 is complete, process 700 ends. In response to a determination that process 700 is not complete, process 700 returns to 705.

In some embodiments, in response to determining that the system is configured or that the configuration workflow is complete, the system may display content pre-loaded to the system. For example, certain content may be pre-loaded in a manufacturing setting before packaging and shipment. The system may display such content by default upon at least the first configuration of the system.

In some embodiments, in response to determining that the system is configured or that the configuration workflow is complete the system displays a home user interface or a menu from which a user may select to perform another function, including pairing a peripheral device, connecting to a network, purchasing/downloading content, etc.

Various embodiments may implement various orders according to which the various configuration settings of the wearable e-reader are implemented. In the example shown in FIG. 7, the IPD is configured before the focus. In other embodiments, the focus of the lens is configured before the IPD, as illustrated in the example shown in FIG. 8.

According to various embodiments, configuration of the wearable e-reader includes configuring various configuration settings. In the examples shown in FIGS. 7 and 8, configuring the wearable e-reader includes configuring an IPD and a focus.

Figure 8:
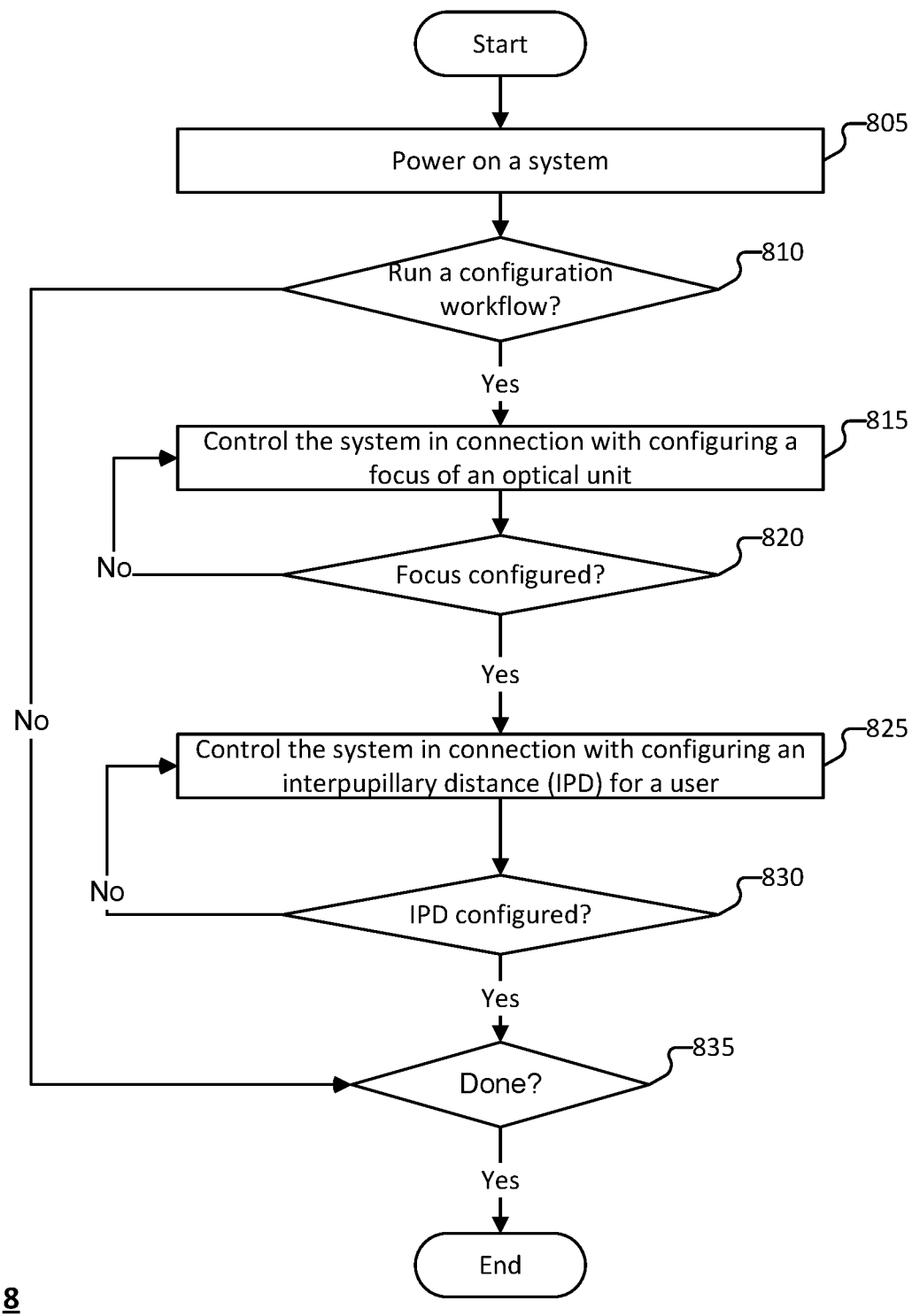
FIG. 8 is a flow diagram illustrating a process for configuring a wearable e-reader according to various embodiments.

FIG. 8 is a flow diagram illustrating a process for configuring a wearable e-reader according to various embodiments. According to various embodiments, process 800 is implemented at least in part by wearable e-reader 100 of FIG. 1 and/or system 200 of FIG. 2.

At 805, a system is powered on. According to various embodiments, 805 corresponds to, or is similar to, 705 of process 700.

At 810, the system determines whether to run a configuration workflow. According to various embodiments, 810 corresponds to, or is similar to 710 of process 700.

In response to determining that the configuration workflow is not to be run at 810, process 800 proceeds to 835. Conversely, in response to determining that the configuration workflow is to be run at 810, process 800 runs the configuration workflow. For example, process 800 proceeds to 815 at which the system is controlled in connection with configuring the focus of an optical unit.

At 820, the system determines whether the focus of the wearable e-reader is configured. response to determining that the focus is not configured at 820, process 800 returns to 815 and process 800 iterates over 815-820 until the system determines that the focus is configured (or until a user exits the configuration workflow or turns off the wearable e-reader). Conversely, in response to determining that the focus is configured at 820, process 800 proceeds to 825.

At 825, the system is controlled in connection with configuring an IPD for the user. According to various embodiments, 825 may correspond to, or be similar to 715 of process 700.

At 830, the system determines whether the IPD is configured. According to various embodiments, 830 may correspond to, or be similar to 720 of process 700. In response to determining that the IPD is not configured at 830, process 800 returns to 825 and process 800 iterates over 825-830 until the system determines that the IPD is configured (or until a user exits the configuration workflow or turns off the wearable e-reader). Conversely, in response to determining that the IPD is configured at 830, the configuration workflow may continue. As an example, the configuration workflow may walk the system/user through the configuration of one or more other settings, such as vertical alignment of the optical units/lenses, etc. Various other configuration settings may be configured via the configuration workflow. In the example shown, in response to determining that the IPD is configured, process 800 may proceed to 835.

At 835, a determination is made as to whether process 800 is complete. In some embodiments, process 800 is determined to be complete in response to a determination the configuration of the wearable e-reader has configured, a user has exited the system, a user indicates that process 800 is to be paused or stopped, the wearable e-reader is powered off, etc. In response to a determination that process 800 is complete, process 800 ends. In response to a determination that process 800 is not complete, process 800 returns to 805.

Figure 9:
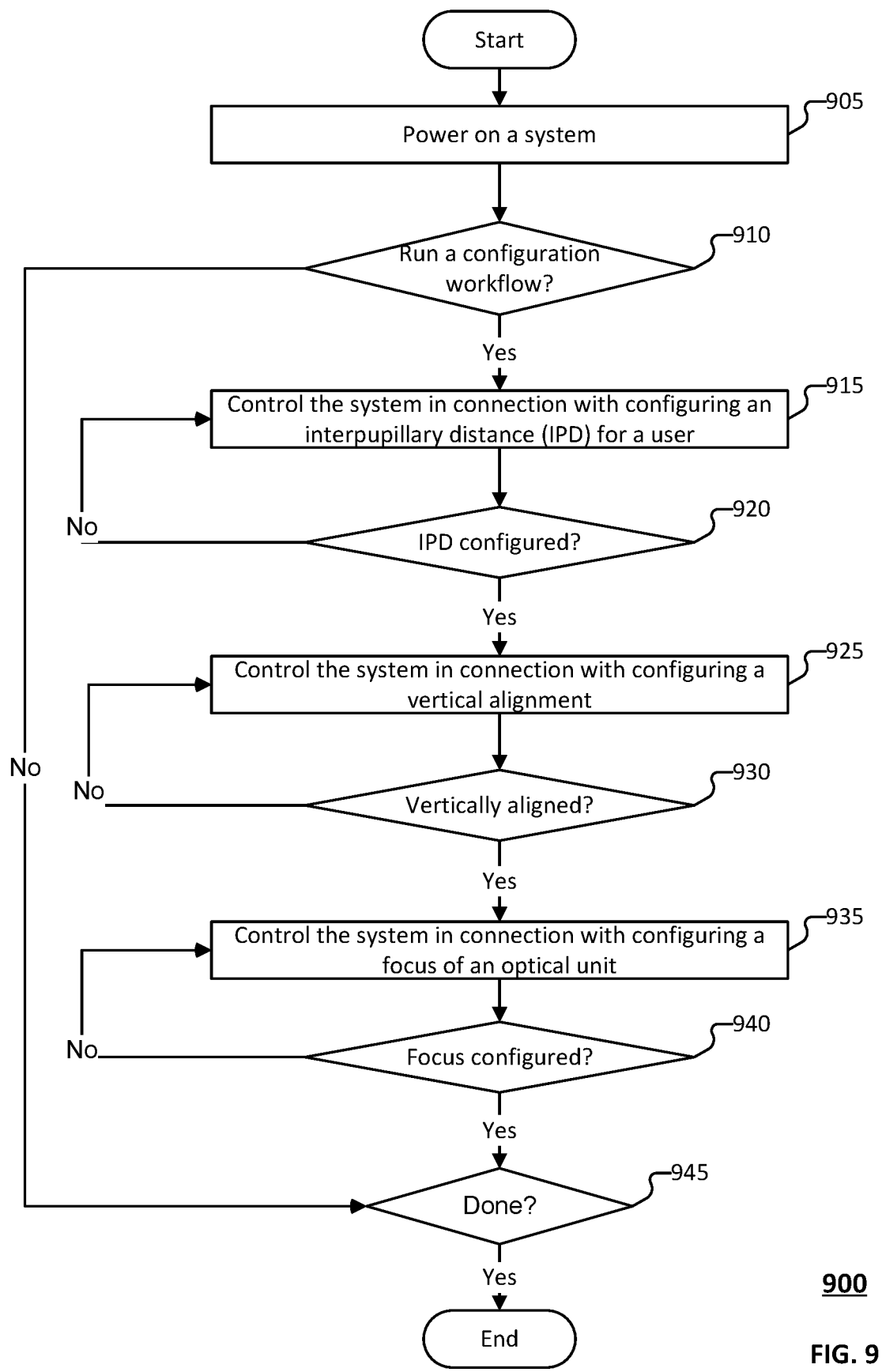
FIG. 9 is a flow diagram illustrating a process for configuring a wearable e-reader according to various embodiments.

FIG. 9 is a flow diagram illustrating a process for configuring a wearable e-reader according to various embodiments. According to various embodiments, process 900 is implemented at least in part by wearable e-reader 100 of FIG. 1 and/or system 200 of FIG. 2.

At 905, a system is powered on. According to various embodiments, 905 corresponds to, or is similar to 705 of process 700.

At 910, the system determines whether to run a configuration workflow. According to various embodiments, 910 corresponds to, or is similar to 710 of process 700.

In response to determining that the configuration workflow is not to be run at 910, process 900 proceeds to 935. Conversely, in response to determining that the configuration workflow is to be run at 910, process 900 runs the configuration workflow. For example, process 900 proceeds to 915 at which the system is controlled in connection with configuring an IPD for a user.

At 920, the system determines whether the IPD is configured. According to various embodiments, 920 corresponds to, or is similar to 720 of process 700.

In response to determining that the IPD is not configured at 920, process 900 returns to 915 and process 900 iterates over 915-920 until the system determines that the IPD is configured (or until a user exits the configuration workflow or turns off the wearable e-reader). Conversely, in response to determining that the IPD is configured at 920, the configuration workflow may continue. In the example shown, in response to determining that the IPD is configured, process 900 may proceed to 925 at which the system is controlled in connection with configuring a vertical alignment of the optical unit/lenses. The vertical alignment of the optical unit/lenses includes invoking process 1500 of FIG. 15.

At 930, the system determines whether the vertical alignment optical unit(s)/lenses is configured.

In response to determining that the vertical alignment is configured at 930, process 900 returns to 925 and process 900 iterates over 925-930 until the system determines that the vertical alignment is configured (or until a user exits the configuration workflow or turns off the wearable e-reader). Conversely, in response to determining that the IPD is configured at 930, the configuration workflow may continue. In the example shown, in response to determining that the vertical alignment is configured, process 900 may proceed to 935 at which the system is controlled in connection with configuring a focus of an optical unit.

At 940, the system determines whether the focus of the wearable e-reader is configured. In response to determining that the focus is not configured at 940, process 900 returns to 935 and process 900 iterates over 935-940 until the system determines that the focus is configured (or until a user exits the configuration workflow or turns off the wearable e-reader). Conversely, in response to determining that the focus is configured at 940, process 900 proceeds to 945.

At 945, a determination is made as to whether process 900 is complete. In some embodiments, process 900 is determined to be complete in response to a determination the configuration of the wearable e-reader has configured, a user has exited the system, a user indicates that process 900 is to be paused or stopped, the wearable e-reader is powered off, etc. In response to a determination that process 900 is complete, process 900 ends. In response to a determination that process 900 is not complete, process 900 returns to 905.

Figure 10:
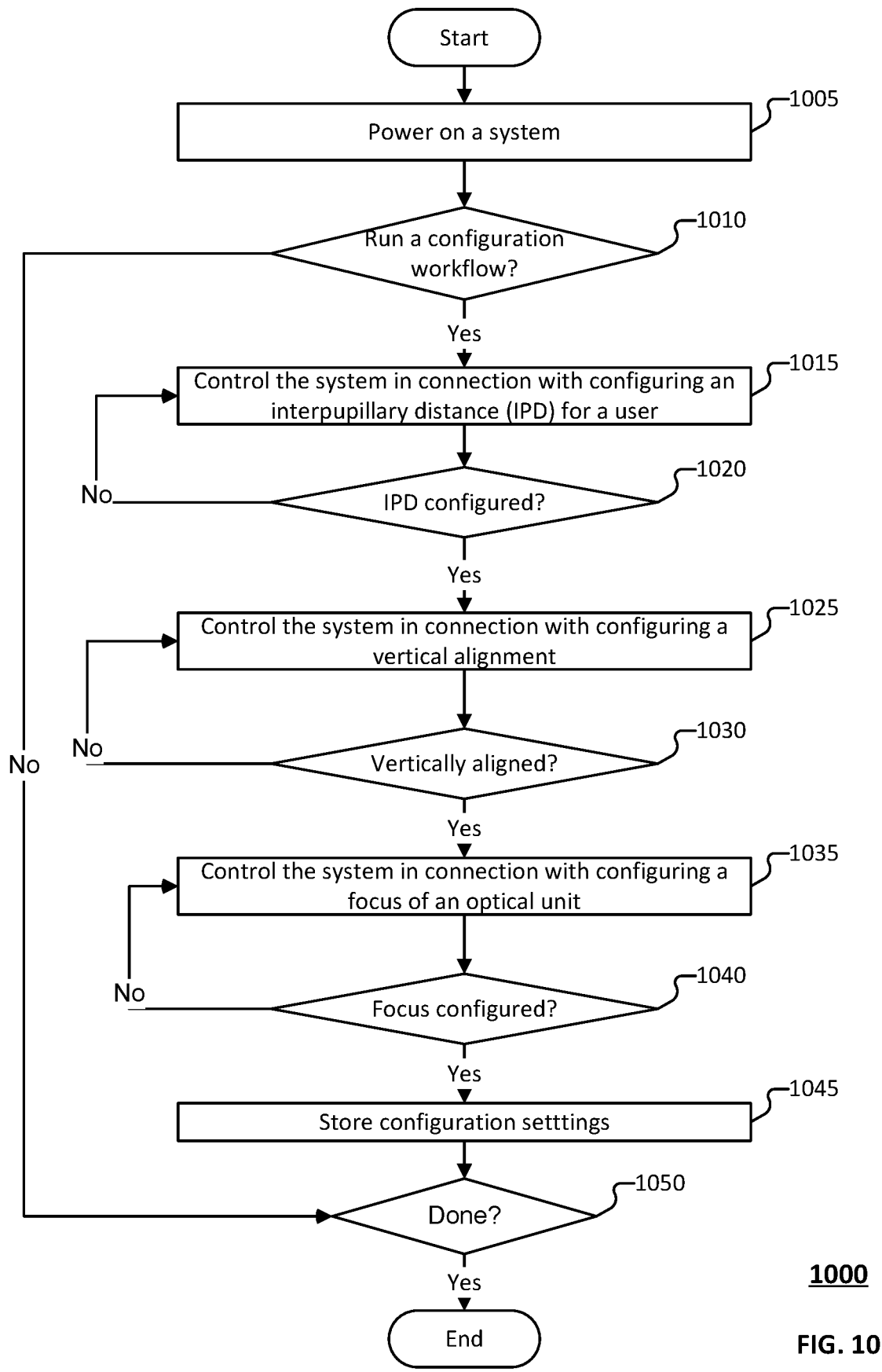
FIG. 10 is a flow diagram illustrating a process for configuring a wearable e-reader according to various embodiments.

FIG. 10 is a flow diagram illustrating a process for configuring a wearable e-reader according to various embodiments. According to various embodiments, process 1000 is implemented at least in part by wearable e-reader 100 of FIG. 1 and/or system 200 of FIG. 2.

According to various embodiments, in addition to configuring various configuration settings of the wearable e-reader, the system is configured to store the various configuration settings. For example, the system stores configuration settings associated with a user in association with a user profile on the system. Storing of the configuration settings may allow the user to quickly re-configure the wearable e-reader in the event that the configuration settings get changed, such as if another user uses the wearable e-reader. The system may store a plurality of user profiles for a plurality of users for storing configuration settings for various users.

At 1005, a system is powered on. According to various embodiments, 1005 corresponds to, or is similar to 705 of process 700.

At 1010, the system determines whether to run a configuration workflow. According to various embodiments, 1010 corresponds to, or is similar to 710 of process 700.

In response to determining that the configuration workflow is not to be run at 1010, process 1000 proceeds to 1050. Conversely, in response to determining that the configuration workflow is to be run at 1010, process 1000 runs the configuration workflow. For example, process 1000 proceeds to 1015 at which the system is controlled in connection with configuring an IPD for a user.

At 1020, the system determines whether the IPD is configured. According to various embodiments, 1020 corresponds to, or is similar to 720 of process 700.

In response to determining that the IPD is not configured at 1020, process 1000 returns to 1015 and process 1000 iterates over 1015-1020 until the system determines that the IPD is configured (or until a user exits the configuration workflow or turns off the wearable e-reader). Conversely, in response to determining that the IPD is configured at 1020, the configuration workflow may continue. In the example shown, in response to determining that the IPD is configured, process 1000 may proceed to 1025 at which the system is controlled in connection with configuring a vertical alignment of the optical unit/lenses.

At 1030, the system determines whether the vertical alignment optical unit(s)/lenses is configured. According to various embodiments, 1030 corresponds to, or is similar to 930 of process 900.

In response to determining that the vertical alignment is configured at 1030, process 1000 returns to 1025 and process 1000 iterates over 1025-1030 until the system determines that the vertical alignment is configured (or until a user exits the configuration workflow or turns off the wearable e-reader). Conversely, in response to determining that the IPD is configured at 1030, the configuration workflow may continue. In the example shown, in response to determining that the vertical alignment is configured, process 1000 may proceed to 1035 at which the system is controlled in connection with configuring a focus of an optical unit.

At 1040, the system determines whether the focus of the wearable e-reader is configured. response to determining that the focus is not configured at 1040, process 1000 returns to 1035 and process 1000 iterates over 1035-1040 until the system determines that the focus is configured (or until a user exits the configuration workflow or turns off the wearable e-reader). Conversely, in response to determining that the focus is configured at 1040, process 1000 proceeds to 1045.

At 1045, the configuration settings are stored. In some embodiments, the system stores configuration settings for the various configurations, such as settings for the IPD configuration, vertical alignment, and focus. Various other configuration settings may be stored. The system may store the configuration settings association with a user profile that is associated with a user. The system may manage/store a plurality of user profiles respectively associated with different users.

According to various embodiments, the system stores the configuration settings based at least in part on one or more user inputs. For example, the system configures and provides a user interface to a user (e.g., a user interface displayed on the displays of the wearable e-reader, or a paired device such as a mobile phone, etc.) via which the user inputs the one or more user inputs. For example, the user uses the user interface to set indications of the configuration settings for the user. The user may navigate a menu on the user interface to perform a lookup or edit of the user profile, such as if the user is seeking to obtain the configuration settings in connection with reconfiguring the wearable e-reader.

In some embodiments, the system configures and provides the user interface for the user to input the configuration settings in response to the system determining that configuration of the various configuration settings (e.g., configuration settings that the user has selected to configure) have been configured and/or determining that the configuration workflow has completed. The system may require a user to configure a set of predefined configuration settings, or a subset of configuration settings selected by the user.

At 1050, a determination is made as to whether process 1000 is complete. In some embodiments, process 1000 is determined to be complete in response to a determination the configuration of the wearable e-reader has configured, a user has exited the system, a user indicates that process 1000 is to be paused or stopped, the wearable e-reader is powered off, etc. In response to a determination that process 1000 is complete, process 1000 ends. In response to a determination that process 1000 is not complete, process 1000 returns to 1005.

Figure 11:
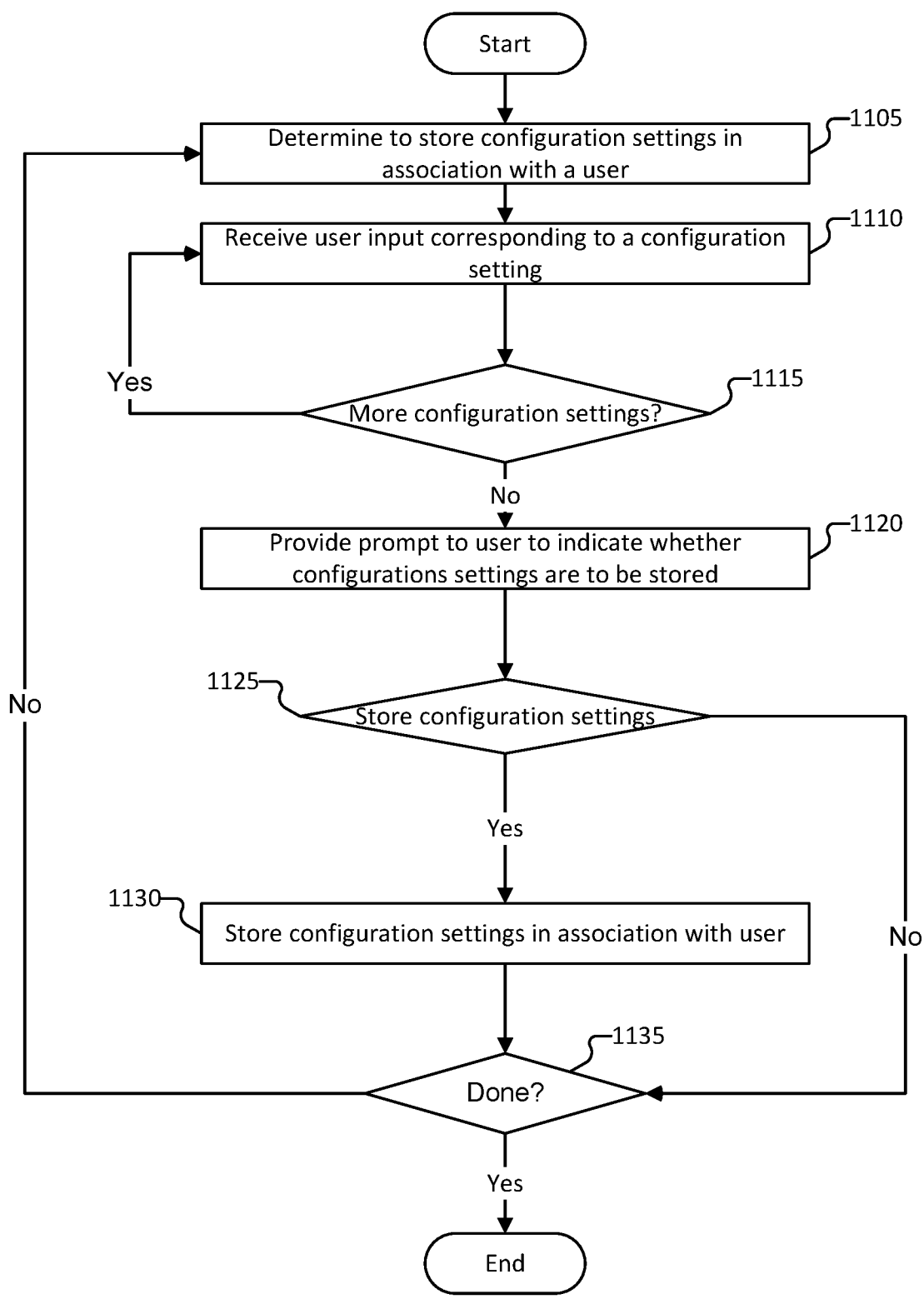
FIG. 11 is a flow diagram illustrating a process for storing configuration settings for a wearable e-reader according to various embodiments.

FIG. 11 is a flow diagram illustrating a process for storing configuration settings for a wearable e-reader according to various embodiments. According to various embodiments, process 1100 is implemented at least in part by wearable e-reader 100 of FIG. 1 and/or system 200 of FIG. 2. In some embodiments, process 1100 is invoked by 1045 of process 1000. For example, process 1100 may correspond to 1045.

At 1105, the system determines to store configuration settings in association with a user.

At 1110, the system receives a user input(s) corresponding to a configuration setting.

At 1115, the system determines whether additional configuration settings are to be stored.

In response to determining that additional configuration settings are to be stored at 1115, process 1100 returns to 1110 and process 1100 iterates over 1110-1115. Conversely, in response to determining that no additional configuration settings are to be stored at 1115, process 1100 proceeds to 1120.

At 1120, the system provides a prompt to a user to indicate whether configuration settings are to be stored. The system may configure and provide a user interface with a prompt requesting the user to indicate/confirm that the configuration settings are to be stored (e.g., stored in association with the user profile). The user interface may include one or more selectable elements via which upon user selection cause the system to commit the storing of the configuration settings, to exit the configuration workflow, etc.

At 1125, the system determines whether to store configuration settings. In response to determining that the configuration settings are not to be stored at 1125, process proceeds to 1135. Conversely, in response to determining that the configuration settings are to be stored at 1125, process 1100 proceeds to 1130.

The system may determine whether to store the configuration settings based at least in part on a user input/selection to the user interface, such as in response to the prompt provided at 1120. For example, in response to receiving a user input that the user confirms the configuration settings are to be stored, the system determines to store the configuration settings.

At 1130, the configuration settings are stored in association with the user. The system may store the configuration settings are stored in association with a user profile for the user. The user profile/configuration settings may be stored locally at the wearable e-reader or, alternatively or additionally, at a remote storage system (e.g., at a server that manages user profiles, etc.).

At 1135, a determination is made as to whether process 1100 is complete. In some embodiments, process 1100 is determined to be complete in response to a determination the configuration of the wearable e-reader has been configured, the configuration settings were successfully stored, a user has exited the system, a user indicates that process 1100 is to be paused or stopped, the wearable e-reader is powered off, etc. In response to a determination that process 1100 is complete, process 1100 ends. In response to a determination that process 1100 is not complete, process 1100 returns to 1105.

Figure 12:
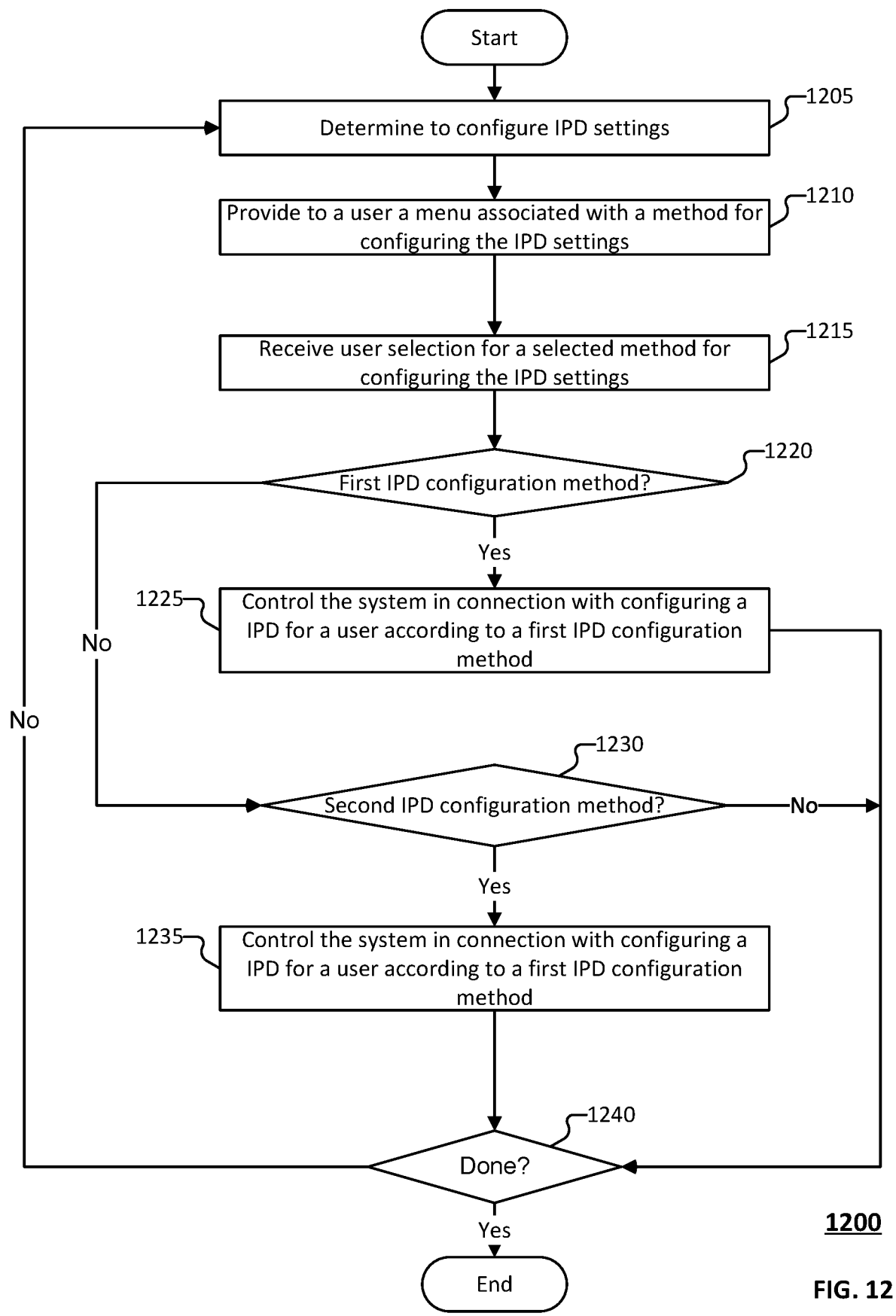
FIG. 12 is a flow diagram illustrating a process for configuring a wearable e-reader according to various embodiments.

FIG. 12 is a flow diagram illustrating a process for configuring a wearable e-reader according to various embodiments. According to various embodiments, process 1200 is implemented at least in part by wearable e-reader 100 of FIG. 1 and/or system 200 of FIG. 2.

In some embodiments, 1200 is invoked by a configuration workflow. As an example, 1200 may be invoked at 715 of process 700 of FIG. 7, 825 of process 800 of FIG. 8, 915 of process 900 of FIG. 9, and/or 1015 of process 1000 of FIG. 10.

At 1205, the system determines to configure the IPD settings.

At 1210, a user menu associated with a method for configuring the IPD settings is configured and provided. In response to determining that the IPD settings are to be configured, the system configures a user interface to provide to the user. The user interface may present a plurality of options for configuring the IPD settings. For example, the user interface may include a plurality of selectable elements respectively corresponding to a method/manner for configuring the IPD settings.

At 1215, the system receives a user selection for a selected method for configuring the IPD settings. The user may input the user selection to the system (e.g., the user interface) via a paired device (e.g., a paired remote, a paired mobile phone) or by selection/pressing of a button on the wearable e-reader. The user input may also input the user selection based on a movement of the user's eyes while wearing the wearable e-reader. For example, the system may implement eye-tracking to determine the manner by which a user moves the user's eyes, and one or more eye movement patterns/schemes may be pre-defined to correspond to one or more functions or indications.

At 1220, the system determines whether the IPD setting is to be configured via the first IPD configuration method. For example, the system determines that the user inputs a selection of the first IPD configuration method at 1215.

In response to determining that the IPD setting is to be configured via the first IPD configuration method at 1220, process 1200 proceeds to 1225 at which the system is controlled in connection with configuring an IPD for a user according to a first IPD configuration method. In some embodiments, process 1300 and/or process 1400 is invoked at 1225.

In response to determining that the IPD setting is not to be configured via the first IPD configuration method at 1220 proceeds to 1230 at which the system determines whether the IPD setting is to be configured via the second IPD configuration method. For example, the system determines that the user inputs a selection of the second IPD configuration method at 1215.

In response to determining that the IPD setting is to be configured via the second IPD configuration method at 1230, process 1200 proceeds to 1235 at which the system is controlled in connection with configuring an IPD for a user according to a second IPD configuration method.

Conversely, in response to determining that the IPD setting is not to be configured via the second IPD configuration method at 1230, process 1200 proceeds to 1240. In some embodiments, the system may iterate over a similar subset of steps such as 1220-1225 or 1230-1235 with respect to other alternative methods for configuring the IPD setting. For example, the system performs such subset of steps for the various options of methods for configuring the IPD settings provided on user interface 1210.

At 1240, a determination is made as to whether process 1200 is complete. In some embodiments, process 1200 is determined to be complete in response to a determination the IPD setting/configuration of the wearable e-reader has been configured, the configuration settings were successfully stored, a user has exited the system, a user indicates that process 1200 is to be paused or stopped, the wearable e-reader is powered off, etc. In response to a determination that process 1200 is complete, process 1200 ends. In response to a determination that process 1200 is not complete, process 1200 returns to 1205.

Figure 13:
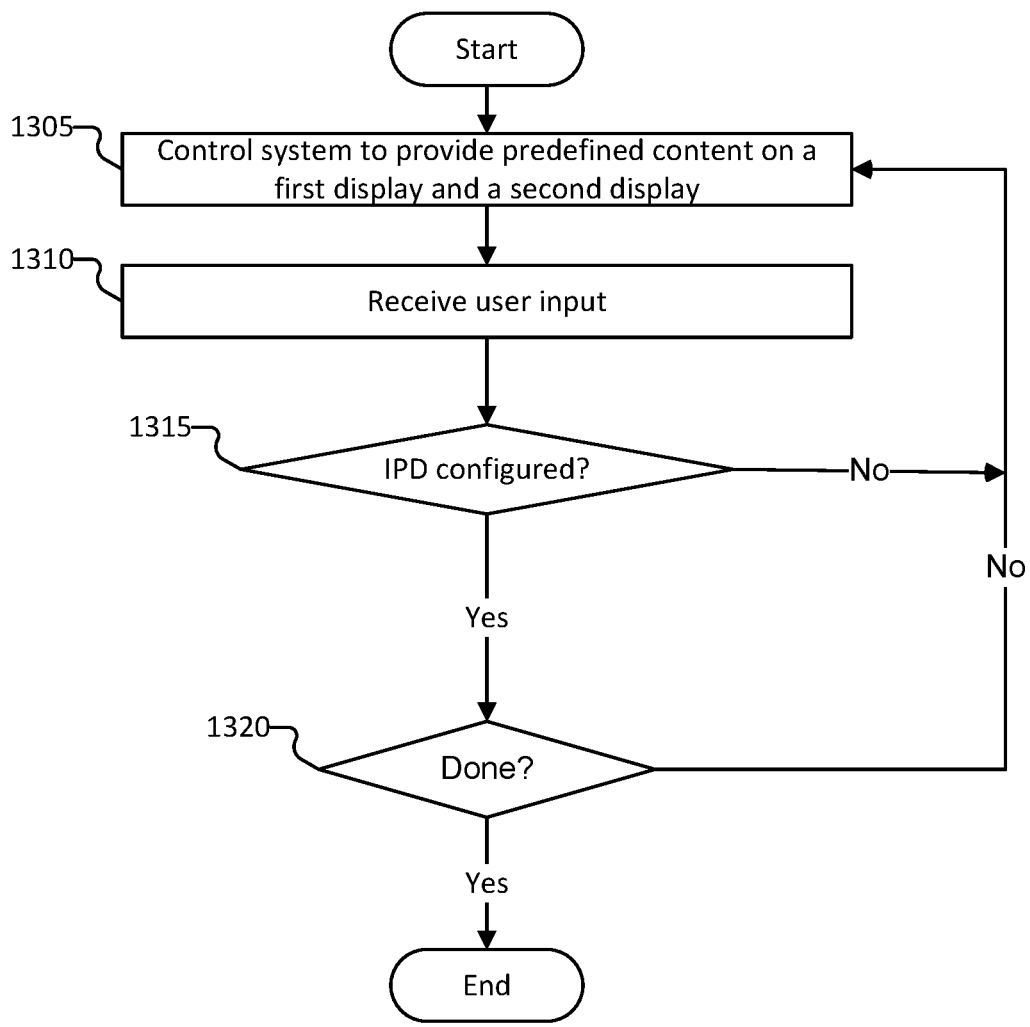
FIG. 13 is a flow diagram illustrating a process for configuring an IPD for a wearable e-reader according to various embodiments.

FIG. 13 is a flow diagram illustrating a process for configuring an IPD for a wearable e-reader according to various embodiments. According to various embodiments, process 1300 is implemented at least in part by wearable e-reader 100 of FIG. 1 and/or system 200 of FIG. 2.

In some embodiments, 1300 is invoked by a configuration workflow. As an example, 1300 may be invoked at 715 of process 700 of FIG. 7, 825 of process 800 of FIG. 8, 915 of process 900 of FIG. 9, and/or 1015 of process 1000 of FIG. 10. As another example, 1300 may be invoked in connection with 1225 of process 1200 of FIG. 12.

At 1305, the system is controlled to provide predefined content on a first display and a second display.

At 1310, the system receives a user input. The system may receive the user input based at least in part on one or more of selection/pressing a button configured on the wearable e-reader, an input to a paired remote (e.g., an input via a physical button or a selectable element/interface on a user interface), an input to a user interface provided on a paired mobile device (e.g., a phone, a tablet, etc.), or performing eye-tracking and detecting whether the user moves its eyes in accordance with a predefined pattern/scheme (e.g., mapped to an indication that the IPD configuration is complete).

At 1315, the system determines whether the IPD setting is configured. In some embodiments, the system determines whether the IPD setting is configured based on the user input. For example, the user input may indicate whether the IPD configuration is complete, etc.

In response to determining that the IPD is not configured at 1315, process 1300 returns to 1305. For example, process 1300 may iterate over 1305-1315 until the IPD is configured. Conversely, in response to determining that the IPD is configured at 1315, process 1300 proceeds to 1320.

At 1320, a determination is made as to whether process 1300 is complete. In some embodiments, process 1300 is determined to be complete in response to a determination the IPD setting/configuration of the wearable e-reader has been configured, the configuration settings were successfully stored, a user has exited the system, a user indicates that process 1300 is to be paused or stopped, the wearable e-reader is powered off, etc. In response to a determination that process 1300 is complete, process 1300 ends. In response to a determination that process 1300 is not complete, process 1300 returns to 1305.

Figure 14:
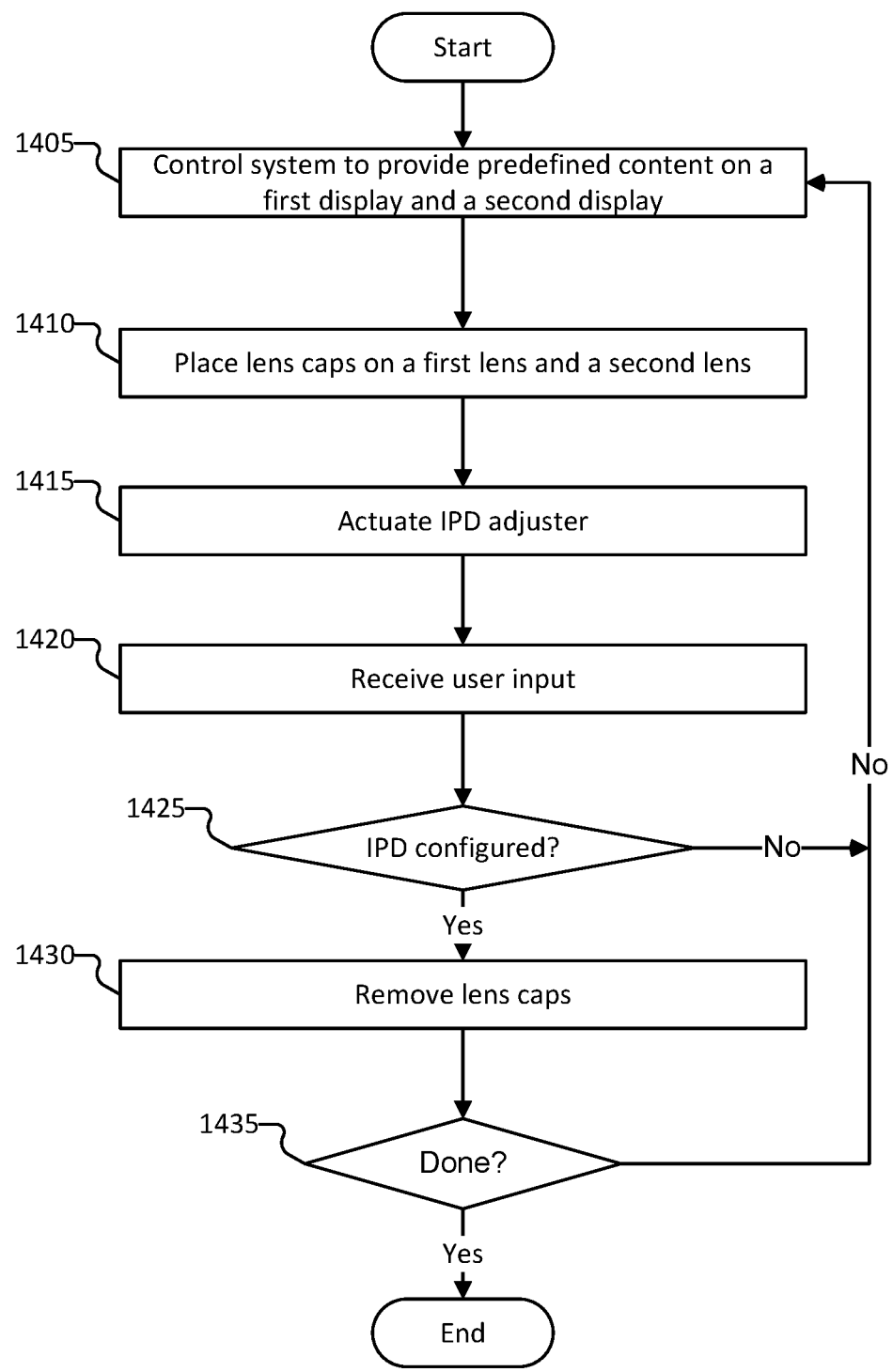
FIG. 14 is a flow diagram illustrating a process for configuring an IPD for a wearable e-reader according to various embodiments.

FIG. 14 is a flow diagram illustrating a process for configuring an IPD for a wearable e-reader according to various embodiments. According to various embodiments, process 1400 is implemented at least in part by wearable e-reader 100 of FIG. 1 and/or system 200 of FIG. 2.

In some embodiments, process 1400 is invoked by a configuration workflow. As an example, process 1400 may be invoked at 715 of process 700 of FIG. 7, 825 of process 800 of FIG. 8, 915 of process 900 of FIG. 9, and/or 1015 of process 1000 of FIG. 10. As another example, process 1400 may be invoked in connection with 1225 of process 1200 of FIG. 12.

At 1405, the system is controlled to provide predefined content on a first display and a second display. In some embodiments, the predefined content is displayed to assist with the IPD configuration. For example, the predefined content corresponds to a particular shape, pattern, or text. In some embodiments, the predefined content provided on the first display is the same as the predefined content provided on the second display. In some embodiments, the predefined content provided on the first display is different from the predefined content displayed on the second display.

At 1410, a lens cap is placed on the first lens and the second lens. In some embodiments, the user manually places the lens caps on the first lens and the second lens. For example, the wearable e-reader may be packaged with instructions indicating that upon first powering on, the system will enter into a configuration workflow, and specifically an IPD configuration, for which the lens caps are to be placed on the lens. In some embodiments, an indication is provided to place a lens cap on a lens (e.g., a display to indicate to a user). In some embodiments, an indication is received that a lens cap has been placed on a lens (e.g., an indication received from a user—for example, a button press).

At 1415, an IPD adjuster is actuated. In some embodiments, the IPD adjuster is actuated (e.g., adjusted) manually by a user. For example, the user turns a knob which adjusts the IPD for the wearable optical unit. In some embodiments, the IPD adjuster is actuated automatically, such as by a motor controlled by the system. In some embodiments, an indication is provided to adjust IPD (e.g., a display to indicate to a user). In some embodiments, an indication is received that IPD has been adjusted (e.g., an indication received from a user—for example, a button press).

The IPD adjuster may be actuated until the predefined content displayed on the first display and the second display is respectively viewable through the preconfigured lens caps on the first lens and the second lens. For example, the preconfigured lens caps may have a hole cutout, such as in the center of the lens cap or other location corresponding to a center of the corresponding lens/display. In the case that the predefined content comprises a dot, the user may adjust the IPD until the dots on the first display and the second display are respectively viewable via the hole in the first lens cap and the second lens cap.

At 1420, a user input is received. The system may receive the user input based at least in part on one or more of selection/pressing a button configured on the wearable e-reader, an input to a paired remote (e.g., an input via a physical button or a selectable element/interface on a user interface), an input to a user interface provided on a paired mobile device (e.g., a phone, a tablet, etc.), or performing eye-tracking and detecting whether the user moves its eyes in accordance with a predefined pattern/scheme (e.g., mapped to an indication that the IPD configuration is complete).

At 1425, the system determines whether the IPD setting is configured. In some embodiments, the system determines whether the IPD setting is configured based on the user input. For example, the user input may indicate whether the IPD configuration is complete, etc.

In response to determining that the IPD is not configured at 1425, process 1400 returns to 1405. For example, process 1400 may iterate over 1405-1425 until the IPD is configured. Conversely, in response to determining that the IPD is configured at 1425, process 1400 proceeds to 1430.

At 1430, the lens caps are removed. In some embodiments, in response to determining that the IPD is configured, the lens caps may be removed. The user may remove the lens caps and place the lens cap in a storage area within the wearable e-reader carry case. The system may display an indication (e.g., text instructing the user) that the lens caps are to be removed. In some embodiments, an indication is provided to remove a lens cap from a lens (e.g., a display to indicate to a user). In some embodiments, an indication is received that a lens cap has been removed from a lens (e.g., an indication received from a user—for example, a button press).

At 1435, a determination is made as to whether process 1400 is complete. In some embodiments, process 1400 is determined to be complete in response to a determination the IPD setting/configuration of the wearable e-reader has been configured, the configuration settings were successfully stored, a user has exited the system, a user indicates that process 1400 is to be paused or stopped, the wearable e-reader is powered off, etc. In response to a determination that process 1400 is complete, process 1400 ends. In response to a determination that process 1400 is not complete, process 1400 returns to 1405.

Figure 15:
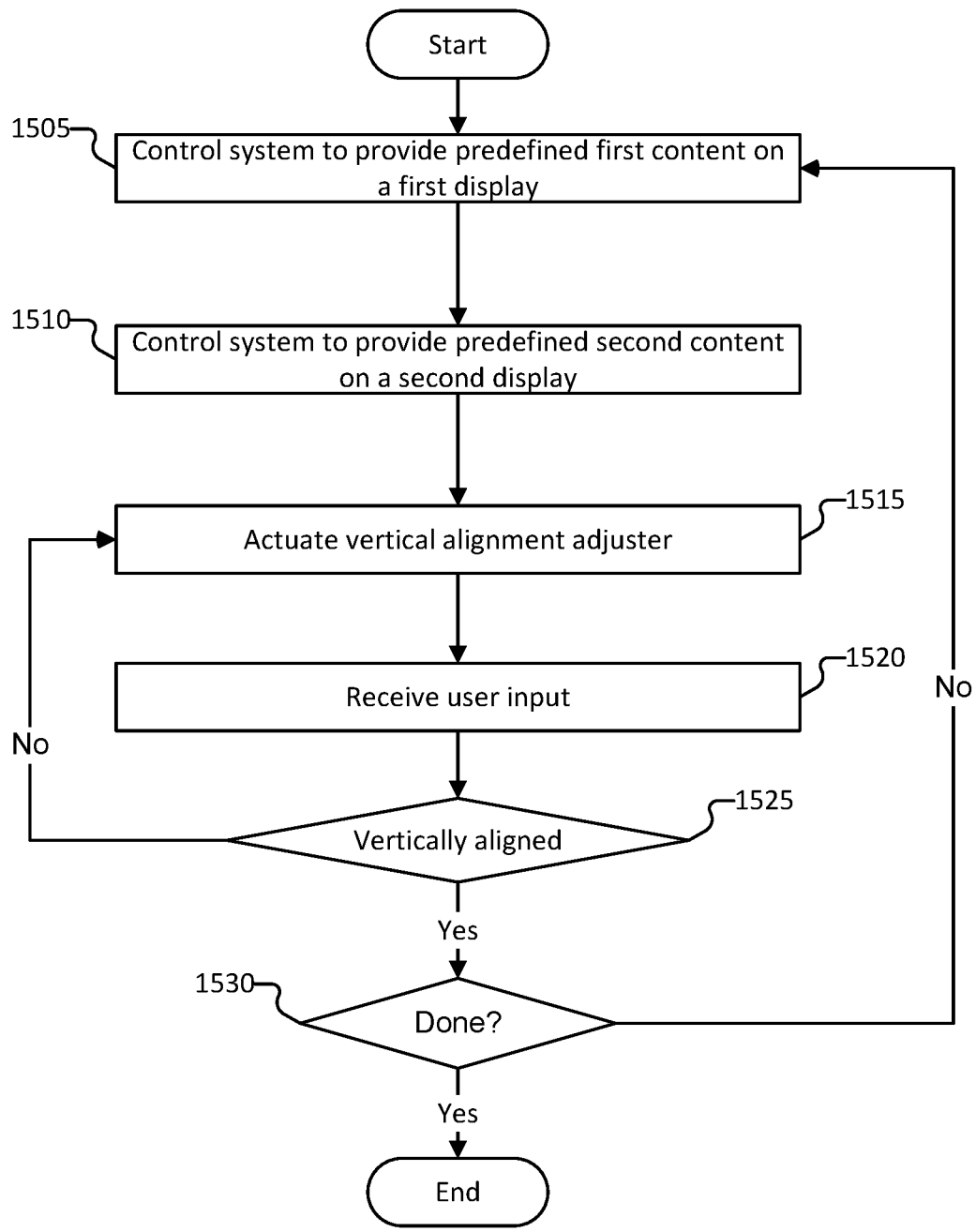
FIG. 15 is a flow diagram illustrating a process for configuring a vertical alignment for a wearable e-reader according to various embodiments.

FIG. 15 is a flow diagram illustrating a process for configuring a vertical alignment for a wearable e-reader according to various embodiments. According to various embodiments, process 1500 is implemented at least in part by wearable e-reader 100 of FIG. 1 and/or system 200 of FIG. 2. 1500 may be invoked during a configuration of the wearable e-reader, such as upon an initialization or reset of the system.

In some embodiments, process 1500 is invoked by a configuration workflow. As an example, process 1500 may be invoked at 930 of process 900 of FIG. 9, and/or 1030 of process 1000 of FIG. 10.

At 1505, the system is controlled to provide predefined first content on a first display. In some embodiments, the first predefined content is displayed to assist with the vertical alignment configuration (e.g., the vertical alignment of the images/information provided on the first display and second display of the wearable e-reader). For example, the predefined content corresponds to a particular shape, pattern, or text.

At 1510, the system is controlled to provide second predefined content on a second display. In some embodiments, the second predefined content is displayed to assist with the vertical alignment configuration (e.g., the vertical alignment of the images/information provided on the first display and second display of the wearable e-reader). For example, the predefined content corresponds to a particular shape, pattern, or text.

In some embodiments, the first predefined content provided on the first display is the same as the second predefined content provided on the second display. In some embodiments, the first predefined content provided on the first display is different from the second predefined content displayed on the second display.

The first predefined content and the second predefined content may correspond to content that includes at least part that extends horizontally. For example, a cross or a straight vertical line may be displayed on the first and second displays, and vertical alignment will align the shapes/information displayed on the various displays. The system may control the first display and the second display to display the first predefined content and the second predefined content at a same respective location/area on the displays.

At 1515, a vertical alignment adjuster is actuated. In some embodiments, the vertical alignment adjuster is actuated (e.g., adjusted) manually by a user. For example, the user turns a knob which adjusts the vertical alignment for the wearable optical unit. In some embodiments, the vertical alignment adjuster is actuated automatically, such as by a motor controlled by the system. The vertical alignment adjuster may correspond to (or comprise) an adjustable nose piece that is manipulated to bring the images on the first display and the second display in vertical alignment. In some embodiments, an indication is provided adjust a vertical alignment adjuster (e.g., a display to indicate to a user). In some embodiments, an indication is received that a vertical alignment adjuster has been adjusted (e.g., an indication received from a user—for example, a button press).

At 1520, a user input is received. The system may receive the user input based at least in part on one or more of selection/pressing a button configured on the wearable e-reader, an input to a paired remote (e.g., an input via a physical button or a selectable element/interface on a user interface), an input to a user interface provided on a paired mobile device (e.g., a phone, a tablet, etc.), or performing eye-tracking and detecting whether the user moves its eyes in accordance with a predefined pattern/scheme (e.g., mapped to an indication that the IPD configuration is complete). The user input may indicate whether that the vertical alignment is complete. For example, the system may instruct the user to provide a particular user input (e.g., press a particular button or selectable element) when the images/information on the displays is vertically aligned.

At 1525, the system determines whether vertical alignment vertical alignment is configured. In some embodiments, the system determines whether the IPD setting is configured based on the user input. For example, the user input may indicate whether the vertical alignment configuration is complete, etc.

In response to determining that the vertical alignment is not configured at 1525, process 1500 returns to 1515. For example, process 1500 may iterate over 1515-1525 until the vertical alignment is configured. Conversely, in response to determining that the IPD is configured at 1525, process 1500 proceeds to 1530.

At 1530, a determination is made as to whether process 1500 is complete. In some embodiments, process 1500 is determined to be complete in response to a determination the vertical alignment setting/configuration of the wearable e-reader has been configured, the configuration settings were successfully stored, a user has exited the system, a user indicates that process 1500 is to be paused or stopped, the wearable e-reader is powered off, etc. In response to a determination that process 1500 is complete, process 1500 ends. In response to a determination that process 1500 is not complete, process 1500 returns to 1505.

Figure 16:
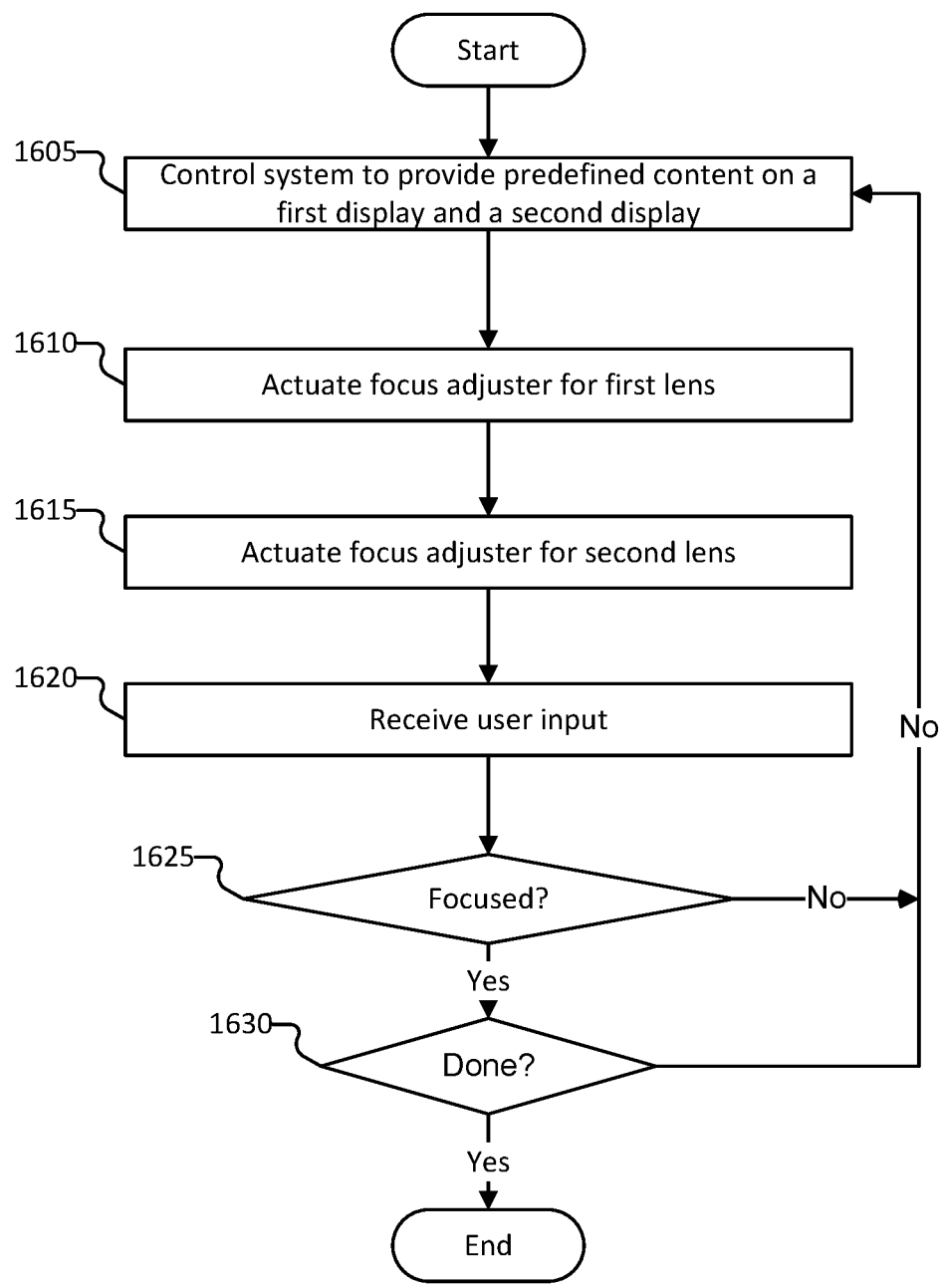
FIG. 16 is a flow diagram illustrating a process for configuring a focus a wearable e-reader according to various embodiments.

FIG. 16 is a flow diagram illustrating a process for configuring a focus a wearable e-reader according to various embodiments. According to various embodiments, process 1600 is implemented at least in part by wearable e-reader 100 of FIG. 1 and/or system 200 of FIG. 2.

In some embodiments, process 1600 is invoked by a configuration workflow. As an example, process 1600 may be invoked at 725 of process 700 of FIG. 7, 815 of process 800 of FIG. 8, 935 of process 900 of FIG. 9, and/or 1035 of process 1000 of FIG. 10.

At 1605, the system is controlled to provide predefined content on a first display and a second display. In some embodiments, the predefined content is displayed to assist with the focus configuration. For example, the predefined content corresponds to a particular shape, pattern, or text. In some embodiments, the predefined content provided on the first display is the same as the predefined content provided on the second display. In some embodiments, the predefined content provided on the first display is different from the predefined content displayed on the second display.

At 1610, a focus adjuster for the first lens is actuated. In some embodiments, the focus adjuster is actuated (e.g., adjusted) manually by a user. For example, the user turns a knob or dial (e.g., a dial on the lens) which adjusts the focus of the lens with respect to the information displayed on the first display of the wearable optical unit. In some embodiments, the focus adjuster is actuated automatically, such as by a motor controlled by the system. In some embodiments, an indication is provided to adjust focus (e.g., a display to indicate to a user). In some embodiments, an indication is received that focus has been adjusted (e.g., an indication received from a user—for example, a button press).

The focus adjuster may be actuated until the predefined content displayed on the first display is viewable through the first lens as focused.

At 1615, a focus adjuster for the second lens is actuated. In some embodiments, the focus adjuster is actuated (e.g., adjusted) manually by a user. For example, the user turns a knob or dial (e.g., a dial on the lens) which adjusts the focus of the lens with respect to the information displayed on the second display of the wearable optical unit. In some embodiments, the focus adjuster is actuated automatically, such as by a motor controlled by the system. In some embodiments, an indication is provided to adjust focus (e.g., a display to indicate to a user). In some embodiments, an indication is received that focus has been adjusted (e.g., an indication received from a user—for example, a button press).

The focus adjuster may be actuated until the predefined content displayed on the second display is viewable through the second lens as focused.

At 1620, a user input is received. The system may receive the user input based at least in part on one or more of selection/pressing a button configured on the wearable e-reader, an input to a paired remote (e.g., an input via a physical button or a selectable element/interface on a user interface), an input to a user interface provided on a paired mobile device (e.g., a phone, a tablet, etc.), or performing eye-tracking and detecting whether the user moves its eyes in accordance with a predefined pattern/scheme (e.g., mapped to an indication that the IPD configuration is complete). The user input may indicate whether the predefined content (e.g., images/information/shapes) displayed on the first display and the second display are viewable as focused.

At 1625, the system determines whether the focus setting is configured. In some embodiments, the system determines whether the focus setting is configured based on the user input. For example, the user input may indicate whether the focusing of the lenses is complete, etc.

In response to determining that the focus setting is not configured at 1625, process 1600 returns to 1605. For example, process 1600 may iterate over 1605-1625 until the focus setting is configured. Conversely, in response to determining that the focus setting is configured at 1625, process 1600 proceeds to 1630.

At 1630, a determination is made as to whether process 1600 is complete. In some embodiments, process 1600 is determined to be complete in response to a determination the focus setting/configuration of the wearable e-reader has been configured (e.g., the information on the displays is viewable as focused, the configuration settings were successfully stored, a user has exited the system, a user indicates that process 1600 is to be paused or stopped, the wearable e-reader is powered off, etc. In response to a determination that process 1600 is complete, process 1600 ends. In response to a determination that process 1600 is not complete, process 1600 returns to 1605.

Figure 17:
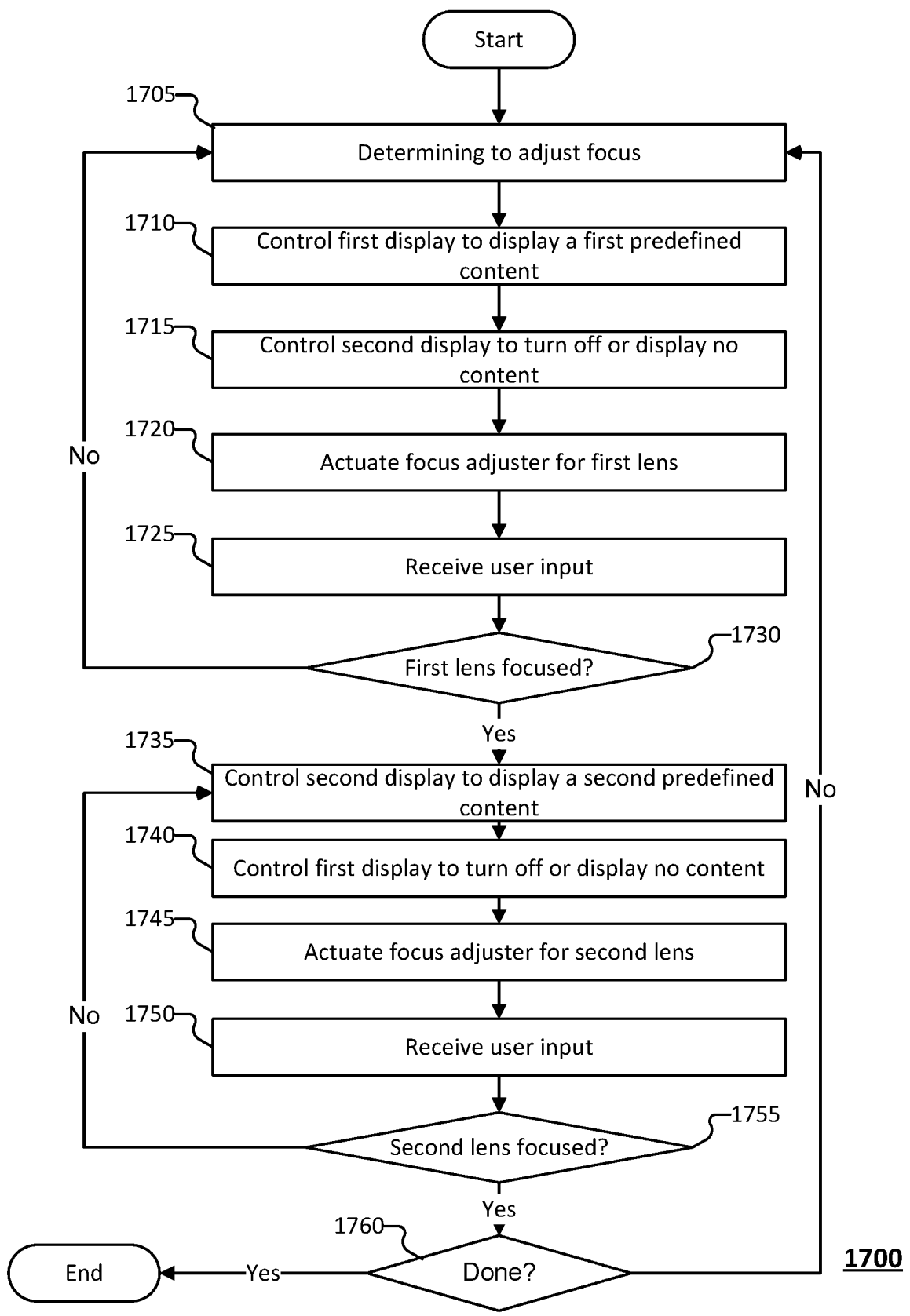
FIG. 17 is a flow diagram illustrating a process for configuring a focus a wearable e-reader according to various embodiments.

FIG. 17 is a flow diagram illustrating a process for configuring a focus a wearable e-reader according to various embodiments. According to various embodiments, process 1700 is implemented at least in part by wearable e-reader 100 of FIG. 1 and/or system 200 of FIG. 2.

In some embodiments, process 1700 is invoked by a configuration workflow. As an example, process 1700 may be invoked at 725 of process 700 of FIG. 7, 815 of process 800 of FIG. 8, 935 of process 900 of FIG. 9, and/or 1035 of process 1000 of FIG. 10.

At 1705, the system controls the first display to display first predefined content on. In some embodiments, the first predefined content is displayed to assist with the focus configuration. For example, the predefined content corresponds to a particular shape, pattern, or text.

At 1715, the system controls the second display to turn off or to display no content.

At 1720, a focus adjuster for the first lens is actuated. In some embodiments, the focus adjuster is actuated (e.g., adjusted) manually by a user. For example, the user turns a knob or dial (e.g., a dial on the lens) which adjusts the focus of the first lens with respect to the information displayed on the first display of the wearable optical unit. In some embodiments, the focus adjuster is actuated automatically, such as by a motor controlled by the system. As an example, the first lens may correspond to a lens for the first eye, and the second lens may correspond to a lens for the second eye, or vice versa. In some embodiments, an indication is provided to adjust focus (e.g., a display to indicate to a user). In some embodiments, an indication is received that focus has been adjusted (e.g., an indication received from a user—for example, a button press).

The focus adjuster may be actuated until the first predefined content displayed on the first display is viewable through the first lens as focused.

At 1725, a user input is received. The system may receive the user input based at least in part on one or more of selection/pressing a button configured on the wearable e-reader, an input to a paired remote (e.g., an input via a physical button or a selectable element/interface on a user interface), an input to a user interface provided on a paired mobile device (e.g., a phone, a tablet, etc.), or performing eye-tracking and detecting whether the user moves its eyes in accordance with a predefined pattern/scheme (e.g., mapped to an indication that the IPD configuration is complete). The user input may indicate whether the first predefined content displayed on the first display is viewable as focused.

At 1730, the system determines whether the focus setting is configured for the first lens. For example, the system determines whether the first lens is focused. In some embodiments, the system determines whether the focus setting is configured based on the user input. For example, the user input may indicate whether the focusing of the first lens is complete, etc.

In response to determining that the focus setting for the first lens is not configured at 1730, process 1700 returns to 1705. For example, process 1700 may iterate over 1705-1725 until the first lens is focused. Conversely, in response to determining that the focus setting is configured at 1725, process 1700 proceeds to 1735.

At 1735, the system controls the second display to display second predefined content on. In some embodiments, the second predefined content is displayed to assist with the focus configuration. For example, the predefined content corresponds to a particular shape, pattern, or text.

At 1740, the system controls the first display to turn off or to display no content.

At 1745, a focus adjuster for the second lens is actuated. In some embodiments, the focus adjuster is actuated (e.g., adjusted) manually by a user. For example, the user turns a knob or dial (e.g., a dial on the lens) which adjusts the focus of the second lens with respect to the information displayed on the second display of the wearable optical unit. In some embodiments, the focus adjuster is actuated automatically, such as by a motor controlled by the system. In some embodiments, an indication is provided to adjust focus (e.g., a display to indicate to a user). In some embodiments, an indication is received that focus has been adjusted (e.g., an indication received from a user—for example, a button press).

The focus adjuster may be actuated until the second predefined content displayed on the second display is viewable through the second lens as focused.

At 1750, a user input is received. The system may receive the user input based at least in part on one or more of selection/pressing a button configured on the wearable e-reader, an input to a paired remote (e.g., an input via a physical button or a selectable element/interface on a user interface), an input to a user interface provided on a paired mobile device (e.g., a phone, a tablet, etc.), or performing eye-tracking and detecting whether the user moves its eyes in accordance with a predefined pattern/scheme (e.g., mapped to an indication that the IPD configuration is complete). The user input may indicate whether the first predefined content displayed on the second display is viewable as focused.

At 1755, the system determines whether the focus setting is configured for the second lens. For example, the system determines whether the second lens is focused. In some embodiments, the system determines whether the focus setting is configured based on the user input. For example, the user input may indicate whether the focusing of the second lens is complete, etc.

In response to determining that the focus setting for the first lens is not configured at 1755, process 1700 returns to 1735. For example, process 1700 may iterate over 1735-1755 until the second lens is focused. Conversely, in response to determining that the focus setting is configured at 1755, process 1700 proceeds to 1760.

At 1760, a determination is made as to whether process 1700 is complete. In some embodiments, process 1700 is determined to be complete in response to a determination the focus setting/configuration of the wearable e-reader has been configured (e.g., the information on the displays is viewable as focused), the configuration settings were successfully stored, a user has exited the system, a user indicates that process 1700 is to be paused or stopped, the wearable e-reader is powered off, etc. In response to a determination that process 1700 is complete, process 1700 ends. In response to a determination that process 1700 is not complete, process 1700 returns to 1705.

Various examples of embodiments described herein are described in connection with flow diagrams. Although the examples may include certain steps performed in a particular order, according to various embodiments, various steps may be performed in various orders and/or various steps may be combined into a single step or in parallel.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for configuring a system having a wearable optical unit, comprising:
   powering on the system; and
   in response to the system being powered on, using one or more processors to control the system to:
      determine whether to cause the system to run a configuration workflow; and
      in response to determining to cause the system to run the configuration workflow,
         control the system in connection with configuring an interpupillary distance (IPD) for a user of the system;
         determine whether the IPD is configured for the user; and
         in response to determining that the IPD is not configured for the user, implement an IPD configuration method based at least in part on an indication that a content displayed on a display of the optical unit is viewable through an opening at a center of a lens cap positioned over a lens of the optical unit.

2. The method of claim 1, wherein controlling the system in connection with configuring the IPD for the user includes:
   providing a menu on a user interface, the menu including a plurality of selectable elements corresponding to a plurality of IPD configuration methods;
   receiving a selection of a first IPD configuration method based at least in part on a user input to the user interface, the first IPD configuration method being one of the plurality of IPD configuration methods; and
   in response to receiving the selection of a first IPD configuration method, controlling the optical unit to display content associated with the first IPD configuration method.

3. The method of claim 2, wherein:
   the optical unit comprises a first optical unit and a second optical unit;
   the first optical unit has a first lens and a first display, and the second optical unit respectively has a second lens and a second display;
   the first IPD configuration method comprises:
      displaying a predefined the content on the first display and the second display; and
      receiving an indication from the user that the IPD is configured.

4. The method of claim 3, wherein the user provides to the system the indication that the IPD is configured to a button comprised in the system or a device that is paired with the system.

5. The method of claim 3, wherein the first IPD configuration method includes placing preconfigured lens caps on the first lens and the second lens, and the user manually actuating an interpupillary distance adjustment mechanism that adjusts the IPD between the first lens and the second lens until the predefined content displayed on the first display and the second display is viewable through the preconfigured lens caps.

6. The method of claim 1, wherein controlling the system in connection with configuring the IPD for the user includes using the optical unit to display predefined content to the user, and receiving an indication from the user that the predefined content is viewable through lens caps placed on lenses of the optical unit.

7. The method of claim 1, wherein determining whether the IPD is configured for the user comprises:
   receiving a user input; and
   determining that the user input corresponds to an indication that the IPD is configured for the user.

8. The method of claim 7, wherein the user input is received based on one or more of (i) selection of a particular button comprised in the system, (ii) detection of a predefined user eye movement, and (iii) receiving an indication that the IPD is configured via a remote device that is paired with the system.

9. The method of claim 1, wherein:
   the optical unit comprises a first optical unit and a second optical unit;

the first optical unit has a first lens and a first display, and the second optical unit respectively has a second lens and a second display; and the method further comprising in response to determining the IPD is configured for the user:

determining whether the optical unit is vertically aligned based on a determination that predefined content displayed on the first display and the second display is vertically aligned with the first lens and the second lens.

10. The method of claim 9, wherein determining that predefined content displayed on the first display and the second display is vertically aligned across the first lens and the second lens comprises:

receiving a user input; and determining that the user input corresponds to an indication that the optical unit is vertically aligned.

11. The method of claim 9, wherein the user manually actuates a vertical alignment adjustment mechanism to cause the predefined content displayed on the first display and the second display to be vertically aligned with the first lens and the second lens, and in response to determining that the predefined content is vertically aligned, receiving a user input indicating that vertical alignment is complete.

12. The method of claim 1, wherein in response to determining that the IPD is configured, controlling the system in connection with configuring a focus of the optical unit, comprising:

using the optical unit to display predefined content;

receiving a user input indicating that the predefined content is in focus; and in response to receiving the user input indicating that the predefined content is in focus, determining that the optical unit is focused.

13. The method of claim 12, wherein in response to determining that the optical unit is focused, determining that the configuration workflow is complete, and controlling the system to provide content as an e-reader.

14. The method of claim 1, wherein:

the optical unit comprises a first optical unit and a second optical unit;

the first optical unit has a first lens and a first display, and the second optical unit respectively has a second lens and a second display; and configuring a focus of the optical unit comprises:

using the optical unit to display predefined content; and the user manually actuating one or more of: (i) a first lens focus adjusting mechanism that adjusts the focus of the first lens until the predefined content is viewable through the first lens as focused, and (ii) a second lens focus adjusting mechanism that adjusts the focus of the second lens until the predefined content is viewable through the first lens as focused.

15. The method of claim 1, wherein:

the optical unit comprises a first optical unit and a second optical unit;

the first optical unit has a first lens and a first display, and the second optical unit respectively has a second lens and a second display; and configuring a focus of the optical unit comprises:

controlling the first display to display first predefined content;

controlling the second display to be turned off or to display no content;

determining whether the first predefined content displayed on the first display is viewable through the first lens as focused; and in response to determining that the first predefined content displayed on the first display is viewable through the first lens as focused, controlling the second display to display second predefined content;

controlling the first display to be turned off or to display no content;

using the optical unit to display predefined content; and determining whether the second predefined content displayed on the second display is viewable through the second lens as focused.

16. The method of claim 15, wherein determining whether the first predefined content displayed on the first display is viewable through the first lens as focused comprises:

receiving a user input indicating that the first predefined content is in focus, wherein the user input is received based on one or more of (i) selection of a particular button comprised in the system, (ii) detection of a predefined user eye movement, and (iii) receiving the indication that the IPD is configured via a remote device that is paired with the system.

17. The method of claim 1, further comprising:

determining whether a focus of the optical unit is configured; and in response to determining that the focus of the optical unit is configured, controlling the optical unit to display content that is pre-loaded to the system.

18. The method of claim 1, wherein the system manages a user profile comprising configuration settings associated with the user, the configuration settings comprising one or more of: (i) an indication of an IPD setting for the user, (ii) an indication of a focus setting for the user, and (iii) an indication of a vertical alignment setting for the user.

19. The method of claim 18, wherein:

the system comprises physical hash marks for one or more of: (a) the IPD setting, (b) the focus setting, and (c) the vertical alignment setting; and the user inputs the IPD setting, the focus setting, or the vertical alignment setting to the user profile via a device paired with the system.

20. The method of claim 1, wherein the optical unit is a first optical unit of a pair of optical units, wherein the indication is a first indication that a first content displayed on a first display of the first optical unit is viewable through a first opening at a center of a first lens cap positioned over a first lens of the first optical unit, and wherein implementing the IPD configuration method is further based at least in part on a second indication that a second content displayed on a second display of the second optical unit of the pair of optical units is viewable through a second opening at a center of a second lens cap positioned over a second lens of the second optical unit.

21. A system, comprising:

an optical unit, wherein the optical unit is wearable; and one or more processors configured to:

determine whether to cause the system to run a configuration workflow; and in response to determining to cause the system to run the configuration workflow, control the system in connection with configuring an interpupillary distance (IPD) for a user of the system;

determine whether the IPD is configured for the user; and in response to determining that the IPD is not configured for the user, implement an IPD configuration method based at least in part on an indication that a content displayed on a display of the optical unit is viewable through an opening at a center of a lens cap positioned over a lens of the optical unit.

22. A computer program product embodied in a non-transitory computer readable medium and comprising computer instructions for:

powering on a system having a wearable optical unit; and
in response to the system being powered on,
   determining, by one or more processors, whether to cause the system to run a configuration workflow; and
   in response to determining to cause the system to run the configuration workflow,
      controlling the system in connection with configuring an interpupillary distance (IPD) for a user of the system;
      determining whether the IPD is configured for the user; and
      in response to determining that the IPD is not configured for the user, implementing an IPD configuration method based at least in part on an indication that a content displayed on a display of the optical unit is viewable through an opening at a center of a lens cap positioned over a lens of the optical unit.

* * * * *